US011925948B2

(12) United States Patent
Gibboney et al.

(10) Patent No.: US 11,925,948 B2
(45) Date of Patent: Mar. 12, 2024

(54) MANUALLY OPERATED DISPENSING PUMP

(71) Applicant: The Procter & Gamble Company, Cincinnati, OH (US)

(72) Inventors: Kelsey Erin Gibboney, Cincinnati, OH (US); Kerry Lloyd Weaver, Florence, KY (US); David Andrew Dalton, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/723,713

(22) Filed: Apr. 19, 2022

(65) Prior Publication Data

US 2022/0234063 A1 Jul. 28, 2022

Related U.S. Application Data

(63) Continuation of application No. 17/157,461, filed on Jan. 25, 2021, now Pat. No. 11,338,310.

(51) Int. Cl.
*B05B 11/00* (2023.01)
*B05B 11/10* (2023.01)

(52) U.S. Cl.
CPC ....... *B05B 11/1077* (2023.01); *B05B 11/1011* (2023.01); *B05B 11/1067* (2023.01)

(58) Field of Classification Search
CPC ............. B05B 11/3077; B05B 11/3067; B05B 11/3011
See application file for complete search history.

(56) References Cited

U.S. PATENT DOCUMENTS

| | | | |
|---|---|---|---|
| 5,392,962 | A | 2/1995 | Meshberg |
| 5,447,257 | A | 9/1995 | Dark |
| 5,462,208 | A | 10/1995 | Stahley et al. |
| 5,551,636 | A | 9/1996 | Foster et al. |
| 5,829,640 | A | 11/1998 | Hershey et al. |
| 6,223,951 | B1 | 5/2001 | Siegel et al. |
| 6,334,549 | B1 | 1/2002 | Fernandez et al. |
| 6,644,516 | B1 | 11/2003 | Foster et al. |
| 6,729,500 | B1 | 5/2004 | Dobbs et al. |
| 6,805,267 | B2 | 10/2004 | Bougamont |
| 8,827,121 | B2 | 9/2014 | Law et al. |
| 11,338,310 | B1 | 5/2022 | Gibboney et al. |

(Continued)

FOREIGN PATENT DOCUMENTS

| | | |
|---|---|---|
| CN | 102941968 A | 2/2013 |
| CN | 102941967 A | 3/2013 |

(Continued)

OTHER PUBLICATIONS

All Office Actions; U.S. Appl. No. 17/157,461, filed Jan. 25, 2021.

*Primary Examiner* — Vishal Pancholi
(74) *Attorney, Agent, or Firm* — Gary J. Foose

(57) ABSTRACT

A manually operated pump including: an inlet one-way valve; a pump chamber downstream of and in fluid communication with the inlet one-way valve; a piston interior to the pump chamber and slideably engaged with the pump chamber; an actuator engaged with the piston or the pump chamber; a block thermoplastic elastomeric spring engaged with the actuator to move the actuator as the block thermoplastic elastomeric spring relaxes; and an optional outlet one-way valve downstream of and in fluid communication with the pump chamber.

20 Claims, 15 Drawing Sheets

(56) References Cited

U.S. PATENT DOCUMENTS

| | | | |
|---|---|---|---|
| 2004/0149777 | A1 | 8/2004 | Santagiuliana |
| 2005/0072807 | A1 | 4/2005 | Hsiao |
| 2015/0136810 | A1 | 5/2015 | Ding |
| 2018/0281004 | A1 | 10/2018 | Nilsson et al. |
| 2019/0054486 | A1 | 2/2019 | Deman et al. |
| 2019/0076864 | A1 | 3/2019 | Nilsson et al. |
| 2019/0203792 | A1 | 7/2019 | Deman et al. |
| 2021/0229123 | A1 | 7/2021 | Liang et al. |

FOREIGN PATENT DOCUMENTS

| | | | |
|---|---|---|---|
| CN | 203064402 | U | 7/2013 |
| CN | 103612823 | A | 3/2014 |
| CN | 103964056 | A | 8/2014 |
| CN | 107264970 | A | 10/2017 |
| CN | 207191834 | U | 4/2018 |
| CN | 109573308 | A | 4/2019 |
| CN | 110723408 | A | 1/2020 |
| CN | 210063843 | U | 2/2020 |
| CN | 210344127 | U | 4/2020 |
| CN | 211686396 | U | 10/2020 |
| CN | 111959940 | A | 11/2020 |
| CN | 112173411 | A | 1/2021 |
| CN | 212291103 | U | 1/2021 |
| EP | 1938903 | A2 | 7/2008 |
| JP | H07144159 | A | 6/1995 |

MANUALLY OPERATED DISPENSING PUMP

FIELD OF THE INVENTION

Manually operated dispensing pumps.

BACKGROUND OF THE INVENTION

Manually operated dispensing pumps are the preferred fluid delivery system for many products such as hand soap, hand sanitizer, dish detergent, shampoo, surface cleaning products, plant care products, scent products, liquid food products, flavorings, and the like. Consumers find these kind of dispensers convenient to use, perform reliably, and are relatively inexpensive.

Manually operated dispensing pumps include many individual parts. For example, a manually operated dispensing pump may include a dip tube, a pump chamber, a piston, a trigger, a nozzle, a spring, and various valves. To simplify recycling of manually operated dispensing pumps, various mechanical designs in which the pumps are fabricated from all plastic materials have been proposed. One limitation of these designs is that the spring mechanism for reloading the pump chamber is complicated to design and manufacture.

With these limitations in mind, there is a continued unaddressed need for manually operated dispensing pumps that include spring mechanisms that are simple to design, manufacture, and manageable in the recycling stream.

SUMMARY OF THE INVENTION

A manually operated pump comprising: an inlet one-way valve; a pump chamber downstream of and in fluid communication with said inlet one-way valve; a piston interior to said pump chamber and slideably engaged with said pump chamber; an actuator engaged with said piston or said pump chamber; and a block thermoplastic elastomeric spring engaged with said actuator to move said actuator as said block thermoplastic elastomeric spring relaxes. Optionally, the pump further comprises an outlet one-way valve downstream of and in fluid communication with said pump chamber.

DETAILED DESCRIPTION OF THE INVENTION

Two common types of manually operated pumps for dispensing products are pump dispensers and trigger sprayers. Pump dispensers are commonly employed to dispense low viscosity liquids, high viscosity liquids, gels, sprays, or foams. Trigger sprayers are commonly employed to dispense low viscosity liquids, sprays, and foams.

Figure 1:
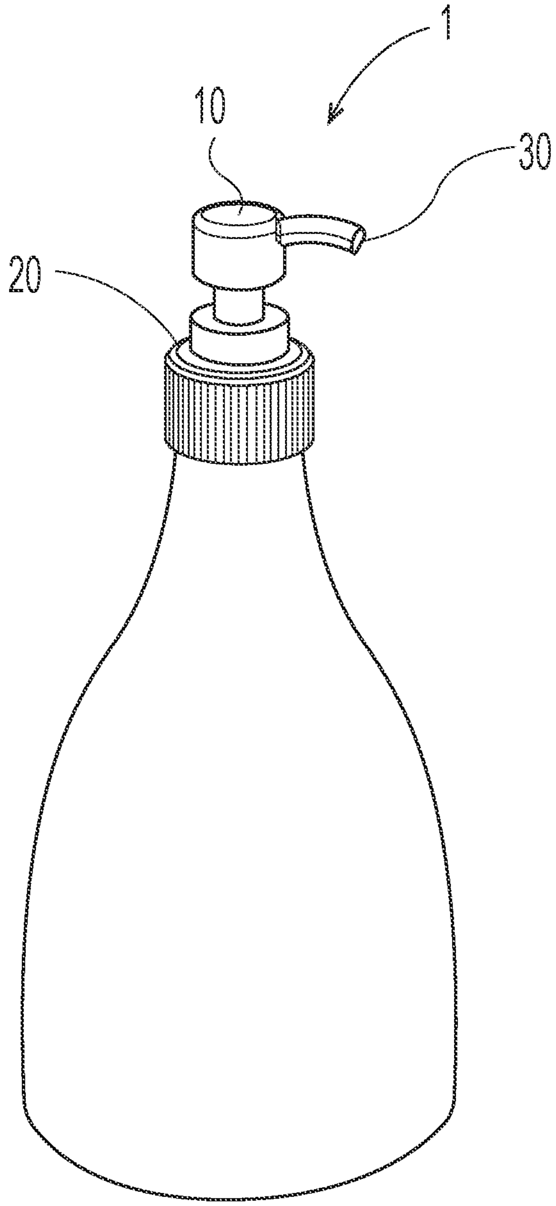
FIG. 1. Pump dispenser.

A pump dispenser 1 is shown in FIG. 1. The pump dispenser 1 is engaged with a container that contains the material to be dispensed. Pump dispensers are typically operated by pressing an actuator 10 in a direction that is aligned with the direction that the piston of the manually operated pump moves. Manually operated pumps are usually provided with a housing 20 within which the internal parts of the manually operated pump are contained. In a simple construction, the dispenser outlet 30 is integral with the actuator 10. Such an arrangement is simple to manufacture, reduces the complexity of the plumbing, and limits the number of separate parts that must be assembled. When the user discharge strokes the actuator 10, both the actuator 10 and the dispensing outlet 30 integral therewith move and material is discharged from the dispenser outlet 30. A spring mechanism is loaded to store energy when the actuator 10 is stroked. The discharge stroke is commonly a push down stroke. When the force applied to the actuator 10 is reduced or released, the spring mechanism releases the stored energy by unloading and drives the reload stroke. During the reload stroke, the pump chamber is reloaded with the material that is to be dispensed by a subsequent discharge stroke. The piston reciprocates rectilinearly relative to or within the pump chamber to discharge liquid or gel from and reload liquid or gel into the pump chamber. The dispenser outlet 30 can optionally be positioned off of actuator 10 so that the dispenser outlet 30 does not move when the actuator 10 moves. Such an arrangement may be practical if a stationary dispenser outlet 30 is more convenient to the user. The dispenser outlet 30 for a pump dispenser 1 can be an open end of the conduit leading to the dispenser outlet 30. Optionally, the dispenser outlet 30 may include a structure to modify the flow from the conduit leading to the dispenser outlet 30 as the flow exits the dispenser outlet 30. Structures that can be employed include a nozzle, a vented nozzle, a nozzle combined with a swirl chamber, a screen, or other constriction or obstruction to create the desired characteristic of the material as it exits the dispenser outlet 30.

Figure 2:
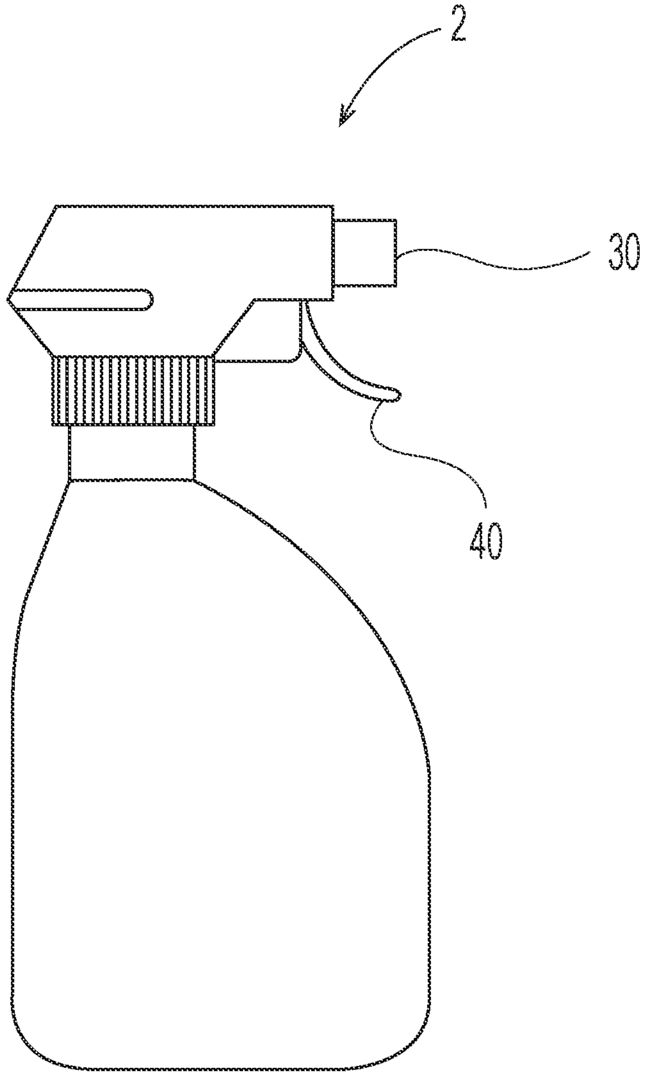
FIG. 2. Trigger sprayer.

A trigger sprayer 2 is shown in FIG. 2. Trigger sprayers 2 operate on the same principles as pump dispensers 1 in that a trigger 40 is pressed to move the piston of the pump relative to the pump chamber. Trigger sprayers 2 tend to have more flexibility in how the actuator 10 can move the piston, as compared pump dispensers 1. The trigger 40 may reciprocate rectilinearly or may reciprocate about a hinge. Various structures that connect the trigger 40 to the piston are possible so that the piston may reciprocate rectilinearly within or relative to the pump chamber. When the user discharge strokes the trigger 40, material is discharged from the dispenser outlet 30. A spring mechanism is loaded to store energy when the trigger 40 is discharge stroked. Like the pump dispenser 1, the spring mechanism releases the stored energy by unloading and drives the reload stroke. The reload stroke reloads the pump chamber with the material to be dispensed by a subsequent discharge stroke. Liquid is discharged from the pump chamber and reloaded into the pump chamber as the piston reciprocates rectilinearly relative to the pump chamber. The dispenser outlet 30 for a trigger sprayer can be the same as those described above for pump dispensers 1. Most commonly, the dispenser outlet 30 for trigger sprayers 2 is structured to deliver a jet of liquid, cone or other shape of spray, or foam.

Figure 3:
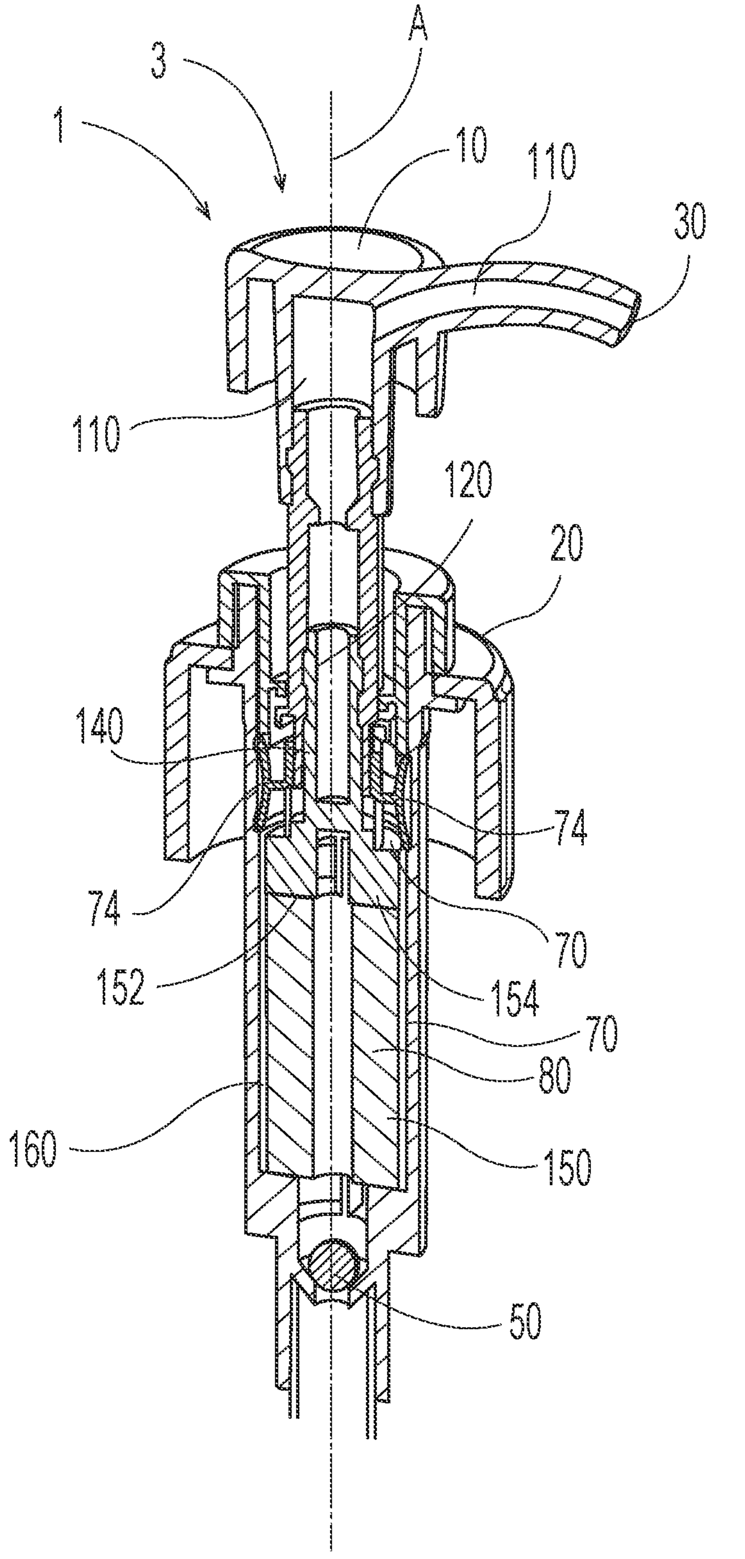
FIG. 3. Pump dispenser cross section.

A cross section of a pump dispenser 1 is shown in FIG. 3. The pump dispenser 1 includes a manually operated pump 3. The manually operated pump 3 per se is common to both a pump dispenser 1 and trigger sprayer 2, the difference between the pump dispenser 1 and trigger sprayer 2 being in how the manually operated pump 3 is operated by the user and structures provided to create the desired characteristics in the material discharged from the dispenser outlet 30.

The manually operated pump 3 comprises the basic elements of an inlet one-way valve 50, a pump chamber 60, a piston 70, actuator 10, and spring mechanism 80. The pump can optionally comprise an outlet one-way valve 90. In operation, liquid or gel is drawn from a container to which the manually operated pump 3 is in fluid communication with, for example via a dip tube. The liquid or gel passes though the inlet one-way valve 50 into the pump chamber 60. The inlet one-way valve 50 permits flow in the downstream direction from the container or dip tube to the one-way valve 50 to the pump chamber 60 and prevents flow in the upstream direction. The pump chamber 60 is downstream of and in fluid communication with the inlet one-way valve 50. The piston 70 is interior to the pump chamber 60 and is slideably engaged with the pump chamber 60. The actuator 10 is engaged with the piston 70 or pump chamber 60. Liquid or gel discharged from the pump chamber is discharged through the dispenser outlet 30. If an outlet one-way valve 90 is provided, liquid or gel discharged from the pump chamber 60 passes through the optional outlet one-way valve 90 on its way to the dispenser outlet 30. The optional outlet one-way valve 90 is downstream of and in fluid communication with the pump chamber. The optional outlet one-way valve 90 permits flow in the downstream direction from the pump chamber 60 to the dispenser outlet 30 and prevents flow in the upstream direction.

The inlet one-way valve 50 and optional outlet one-way valve 90 can be a free-floating ball check valve. A free-floating ball check valve can comprise a ball housed within a valve chamber and the ball is sized and dimensioned to conform with an entryway to the valve chamber. Liquid or gel flowing into the valve chamber dislodges the ball from being seated in the entryway to the valve chamber. The valve chamber exit is sized and dimensioned to restrain the ball within the valve chamber. Optionally, the inlet one-way valve 50 and optional outlet one-way valve 90 can be independently selected from the group consisting of a free-floating ball check valve, spring-loaded ball check valve, a diaphragm check valve, a swing check valve, a flapper valve, a clapper valve, a backwater valve, a lift check valve, an in-line check valve, an umbrella valve, and a duckbill valve. An outlet one-way valve 90 is optional. Including an outlet one-way valve 90 can be desirable if a liquid is to discharged as a spray, either by way of a pump dispenser 1 or trigger sprayer 2. The outlet one-way valve 90 can provide for the development of a high enough pressure to form the spray and a shutoff to avoid dripping below a selected pressure.

As described above, the piston 70 is interior to the pump chamber 60 and slideably engaged with the pump chamber 60. That is, the piston 70 and the pump chamber 60 are moveable relative to one another. The piston 70 can be moveable within a stationary pump chamber 60, which is a practical approach. Optionally, the pump chamber 60 can be moveable with respect to a stationary piston 70.

The piston 70 can conform to the interior surface of the pump chamber 60. A gasket or piston skirt 74 can be positioned between the piston 70 and interior surface of the pump chamber 60 to provide a seal between the piston 70 and pump chamber 60. The gasket or piston skirt 74 can be connected to one of the piston 70 or pump chamber 60. Pressure developed in the liquid or gel within the pump chamber 60 can drive liquid or gel towards the dispenser outlet 30. If an outlet one-way valve 90 is provided the pressure developed in the liquid or gel within the pump chamber 60 can drive liquid or gel through the outlet one-way valve 90. The outlet conduit 110 for flow from the pump chamber 60 can comprise a piston bore 120 through the piston crown 130, piston skirt 74 and piston rod 140 of the piston 70. The piston bore 120 is an open bore through which flow of liquid or gel can occur. The piston 70 can comprise a piston crown 130, a piston skirt 74 extending from the piston crown 130 to the piston rod 140 and in conformance with the interior surface of the pump chamber 60. Optionally, an outlet conduit 110 from the pump chamber 60 can be provided separate from the piston 70. For example, the outlet conduit 110 can be an open tube connected to the interior of the pump chamber 60.

If provided, the optional outlet one-way valve 90 can be at the entrance of the outlet conduit 110, within the outlet conduit 110, or at the exit of the outlet conduit 110. The outlet conduit 110 is downstream of the pump chamber 60. The outlet conduit 110 can be described as being downstream of the pump chamber 60. If an outlet one-way valve 90 is provided, the outlet conduit 110 can be described as being downstream of the outlet one-way valve 90. The outlet conduit 110 can lead to a dispenser outlet 30 downstream of the outlet conduit 110. The dispenser outlet 30 can comprise a nozzle, a vented nozzle, a nozzle combined with a swirl chamber, a screen, or other constriction or obstruction to create the desired characteristic of the material as it exits the dispenser outlet 30.

The actuator 10 can be engaged with the piston 70 or pump chamber 60, depending on the mechanism for providing movement of the piston 70 and pump chamber 70 relative to one another. The actuator 10 can be pressed to actuate movement of the piston 70 and pump chamber 60 relative to one another. In a reasonably practical arrangement, the actuator 10 is engaged with the piston 70 to drive movement of the piston 70 within a stationary pump chamber 70. That is the piston 70 can move relative to a stationary pump chamber 70.

The actuator 10, outlet conduit 110, and optional outlet one-way valve 90 together can be rectilinearly moveable to drive the piston 70. The user may cyclically press and release the actuator 10 to dispense liquid or gel from the container to which the pump dispenser 1 is attached. The actuator 10 can be integral with the outlet conduit 110. The actuator 10 can be joined to the outlet conduit 110 as compression fitted parts, snap together parts, glued parts, solvent welded parts, thermal bond parts, screwed together parts, interlocking parts, or other alternative for joining two parts to one another. Similarly, the optional outlet one-way valve 90 and outlet conduit 110 may be joined to one another by way of the same structural relationships described for joining the actuator 10 and outlet conduit 110 or be integral with the actuator 10. And the piston 70 can be joined to the optional outlet one-way valve 90 by way of the same structural relationships described for joining the actuator 10 and outlet conduit 110 or be integral with the optional outlet one-way valve 90.

The spring mechanism 80 can be a block thermoplastic elastomeric spring 150. The block thermoplastic elastomeric spring 150 can be engaged with the actuator 10 to move the actuator 10 as the block thermoplastic elastomeric spring 150 relaxes. The block thermoplastic elastomeric spring 150 can be loaded and unloaded in concert with the actuator 10 being pressed to load the block thermoplastic elastomeric spring 150 and released to unload the block thermoplastic elastomeric spring 150. The actuator 10 can be considered to have an upstroke position and a downstroke position, the upstroke position being associated with liquid or gel having been drawn into the pump chamber 60 from the container and the downstroke position being associated with liquid or gel having been discharged from the pump chamber 60. The block thermoplastic elastomeric spring 150 can relax in that stored potential energy is converted into kinetic energy to move the actuator 10 from the downstroke position to the upstroke position. The block thermoplastic elastomeric spring 150 can be engaged with the actuator 10 to move the actuator 10 as the block thermoplastic elastomeric spring 150 relaxes or rebounds subsequent to compression. In use, the user presses the actuator 10 to compress the block thermoplastic elastomeric spring 150 and move the piston 70 and pump chamber 60 relative to one another in discharge stroke until the actuator is at its downstroke position. The user then releases the actuator 10 and the block thermoplastic elastomeric spring 150 rebounds to move the piston 70 and pump chamber 60 relative to one another in a recharge stroke until the actuator is at its upstroke position.

The block thermoplastic elastomeric spring 150 can be positioned within the pump chamber 60, as shown in FIG. 3. In such an arrangement, the block thermoplastic elastomeric spring 150 is contact with the liquid or gel that passes through the pump chamber 60.

Historically, metal or plastic coil springs have been used as the spring mechanism 80. Coil springs can be inconvenient or expensive to manufacture. Complicated machinery may be required to grab, manipulate, and position a coil spring in a manually operated pump 3. Coil springs also may not be chemically compatible with the liquid or gel that the manually operated pump 3 is designed to dispense. Moreover, coil springs are commonly formed of a material that differs from the material that constitutes other parts of the manually operated pump 3. Employing a block thermoplastic elastomeric spring 150 can improve the recyclability of a manually operated pump 3 since particular components of the spring mechanism 80 may not need to be separated out or may be easily separated out in conventional recycling processes. Once the manually operated pump 3 has reached the end of its design life, it may be placed in the recycling stream and separation of the materials that constitute the manually operated pump 3 may be simplified.

A block thermoplastic elastomeric spring 150 is not a coil or a coil spring. A block thermoplastic elastomeric spring 150 is a coilless spring. That is, the block thermoplastic elastomeric spring 150 can be a coilless block thermoplastic elastomeric spring 150. The block thermoplastic elastomeric spring 150 can be without a coiled structure or a spring in which a coil is not present.

A block thermoplastic elastomeric spring 150 can be a block of thermoplastic elastomer material. A thermoplastic elastomer is an elastomer comprising a thermoreversible network. An elastomer is a polymer that displays rubber-like elasticity. Elastomers have weak intermolecular forces. The block thermoplastic elastomeric spring 150 can comprise more than 50% thermoplastic elastomer material, by weight of the block thermoplastic elastomeric spring 150. The block thermoplastic elastomeric spring 150 can comprise more than 90%, or even 100%, thermoplastic elastomer material, by weight of the block thermoplastic elastomeric spring 150. The thermoplastic elastomer material can be cross-linked or non-crosslinked.

The thermoplastic elastomer material can be selected from the group consisting of thermoplastic styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof.

The block thermoplastic elastomeric spring 150 can have a density greater than or less than 1 g/cm$^3$. The thermoplastic elastomer material per se constituting the block thermoplastic elastomeric spring 150 can have a density greater than 1 g/cm$^3$. Density of the block thermoplastic elastomeric spring 150 and thermoplastic elastomer material per se can be increased to a desired level by including densifier materials. Optionally, the density of the block thermoplastic elastomeric spring 150 and thermoplastic elastomer material per se can be decreased to a desired level by including lightweight fillers or using a foam structure. Moreover, the density of the block thermoplastic elastomeric spring 150 and thermoplastic elastomer material per se can be designed so that the part or material thereof floats or sinks, as desired or intended, in water or other aqueous or liquid medium to facilitate separation of the part or material in a float separation process used in a recycling process for mixed materials.

Optionally, the block thermoplastic elastomeric spring 150 can have a density less than 1 g/cm$^3$. Optionally, the thermoplastic elastomer material per se constituting the block thermoplastic elastomeric spring 150 can have a density less than 1 g/cm$^3$. Such a block thermoplastic elastomeric spring 150 or thermoplastic elastomer material per se will float in water and can be practically separated from materials that sink.

The block thermoplastic elastomeric spring 150 can have an actuator facing surface 152 and an opposing reaction surface 153. The actuator facing surface 152 can be oriented towards the actuator 10. The reaction surface 153 can be oriented away from the actuator 10. The actuator facing surface 152 and reaction surface 153 can be substantially orthogonal to or orthogonal to the central axis A, the central axis A being substantially in line with or in line with the relative movement of the piston 70 and pump chamber 60. In operation, when the user actuates the actuator 10, some of the force applied by the user is transmitted to the block thermoplastic elastomeric spring 150 to be stored and then released to drive the actuator 10 through the upstroke and some is transferred to the piston 70 or pump chamber 60 to drive the manually operated pump 3 through a downstroke. Force may be applied over the entire actuator facing surface 152 or concentrated upon only a portion thereof. For three dimensional elastic bodies, a point load or a local load applied to a small part of a surface can result in greater deformation than the same load distributed over a larger part of the surface. That is because for a point load or local load, the deformation of the surface tends to be more three dimensional in nature as opposed to tending towards more one-dimensional deformation for same load distributed over a larger part of the surface. To drive the full range of rectilinear motion of the pump mechanism, the block thermoplastic elastomeric spring 150 must be deformed either locally or globally by a magnitude equal to the stroke length of the rectilinear motion. As such, locally loading or point loading of the block thermoplastic elastomeric spring 150 can be advantageous over a more widely distributed load because more displacement can occur with point or local loading as compared to a more widely distributed load. That can reduce the amount of force the user needs to generate to actuate the actuator 10 through a full downstroke to drive full movement of the piston 70 and pump chamber 60 relative to one another to move liquid or gel through the system.

Stress concentrators 154 can be provided to concentrate load transmitted from the actuator 10 to only a portion of the actuator facing surface 152. Similarly, stress concentrators 154 can be positioned in contact with the reaction surface 153 to receive force transferred through the block thermoplastic elastomeric spring 150. Only a portion of the actuator facing surface 152 may be engaged with the actuator through one or more stress concentrators 154. Similarly, only a portion of the reaction surface 153 may be engaged with stress concentrators 154 that transfer force away from thermoplastic elastomeric spring 150. The stress concentrators 154 can be between the actuator facing surface 152 and the piston 70. Only a portion of the actuator facing surface 152 and or reaction surface 153 may be engaged with the actuator 10 through one or more stress concentrators 154. The stress concentrators 154 can provide for local stressing of the actuator facing surface 152 and or reaction surface 153. As described previously, for a given load, localized stressing of a three dimensional elastic body can result in more deformation of the body than more widely distributed applied stress.

The stress concentrators 154 can extend from the piston 70. The stress concentrators 154 provide for a reduced area over which a force is applied to the actuator facing surface 152 and or reaction surface 153. The stress concentrators 154 can be one or more fins 156, cylindrical pins, conical pins, frustoconical pins, extending from the piston 70 or supporting the reaction surface 153 of the block thermoplastic elastomeric spring 150, the stress concentrators 154 contacting only a portion of the actuator facing surface 152 and or reaction surface 153 of the block thermoplastic elastomeric spring 150. The block thermoplastic elastomeric spring 150 can be positioned within the pump chamber 60. The actuator facing surface 152 can be facing the stress concentrators 154 that extend from the piston 70. The reaction surface 153 can be facing stress concentrators 154 that support the block elastomeric spring 150, whether the block thermoplastic elastomeric spring 150 is outside of or within the pump chamber 60. The stress concentrators 154 can contact less than about 50%, optionally less than about 25%, optionally less than about 20%, optionally less than about 15%, optionally less than about 10%, optionally less than about 5% of the area of the actuator facing surface 152 and or reaction surface 153. Such fractions of contact area may be practical if the block thermoplastic elastomeric spring 150 is within the pump chamber 60 or external to the pump chamber 60. The stress concentrators 154 can have a footprint 155 in contact with the actuator facing surface 152 and or reaction surface 153. The smaller the fraction of contact area the greater the local deformation of the actuator facing surface 152 and or reaction surface 153 under a particular force applied to the actuator 10. For a fixed number of stress concentrators 154, the structural stability of stress concentrators 154 may increase with increased fraction of contact area since bulkier structures may be used.

Figure 13A:
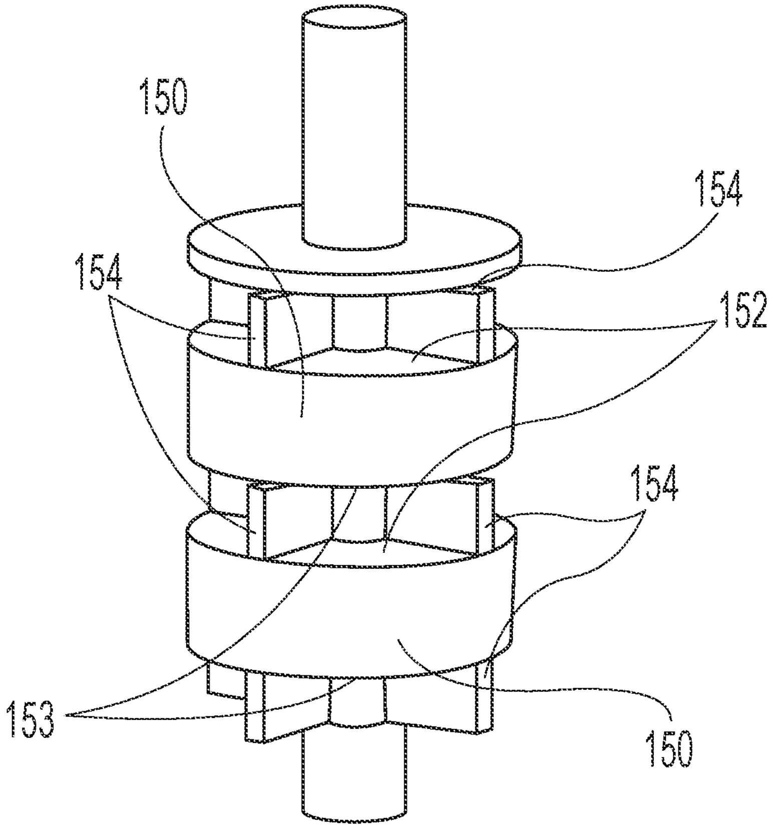
FIG. 13A. Series of block thermoplastic elastomeric springs separated by stress concentrators.

A plurality of block thermoplastic elastomeric springs 150 may be stacked in series with one another. The block thermoplastic elastomeric springs 150 can have the same or different elastomeric properties and or geometry. The elastomeric properties and or geometry of individual block thermoplastic elastomeric springs 150 stacked in series can be selected to provide for the desired force response relationship. Individual block elastomeric springs 150 in the series can be separated from one another by stress concentrators 154 positioned between the block elastomeric springs 150. The stress concentrators can 154 conduct force from one block thermoplastic elastomeric spring 150 to an adjacent block thermoplastic elastomeric spring 150. The stress concentrator 154 function like the loading member discussed herein with respect to the compression spring. The stress concentrator 154 loads the block thermoplastic elastomeric spring 150 from one or both of the actuator facing surface 152 or reaction surface 153, like the loading member loads the elastomeric tube. For example, the block elastomeric spring 150 shown in FIGS. 3, 4, and 6 can be replaced by a plurality of block thermoplastic elastomeric springs 150, for example as shown in FIGS. 13A and B. The plurality of block thermoplastic elastomeric springs 150 can be provided as a stack of block thermoplastic elastomeric springs in series with one another. Optionally, the each of the block thermoplastic elastomeric springs 150 in the series can be separated from one another by one or more stress concentrators 154 positioned between each of or just some of the block thermoplastic elastomeric springs 150 in the series. The stress concentrators 154 apply stress to the actuator facing surface 152 or actuator facing surfaces 152 and or the reaction surface 153 or reaction surfaces 153 over only a portion thereof. In operation, such a stack can provide for a greater magnitude of displacement under the same force as compared to a single block thermoplastic elastomeric spring 150 since the individual deformations of each of the block thermoplastic elastomeric springs 150 are additive to one another to provide for the cumulative deformation of the series of block thermoplastic elastomeric springs 150. Furthermore, employing a series of block thermoplastic elastomeric springs 150 can be practical since the force-deformation curve may tend to be more linear for small forces and users are more familiar with pumps that have a linear force-response curve such as those that employ metal coil springs.

Figure 13B:
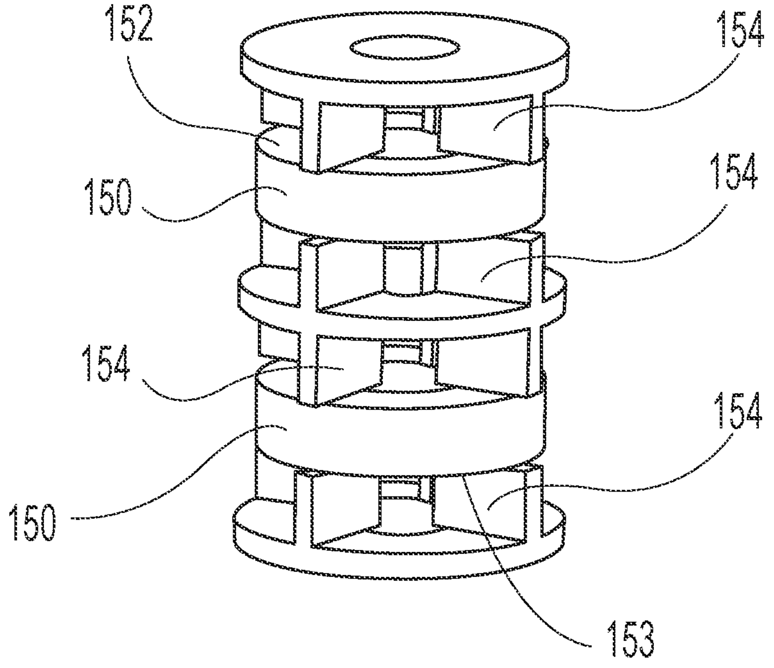
FIG. 13B. Series of block thermoplastic elastomeric springs separated by stress concentrators having openings through which flow of liquid can occur.

The series of block thermoplastic elastomeric springs 150 shown in FIG. 13A can be practical for pump dispensers 1 and trigger sprayers 2 in which the block thermoplastic elastomeric springs 150 are outside of the pump chamber 60. For pump dispensers 1, flow from the pump chamber 60 can be driven through the piston bore 120 that passes through the series of block thermoplastic elastomeric springs 150 for a pump dispenser 1. Similarly, the series of block thermoplastic elastomeric springs 150 can be positioned outside the pump chamber 60 to drive the return stroke of the trigger 40. The series of block thermoplastic elastomeric springs 150 shown in FIG. 13B can be practical for pump dispensers 1 and trigger sprayers 2 in which block thermoplastic elastomeric springs 150 are inside the pump chamber 60 since liquid can pass through openings in the series of block thermoplastic elastomeric springs 150 and stress concentrators 154, the openings being continuous with one another.

The inlet one-way valve 50, pump chamber 60, piston 70, actuator 10, and block thermoplastic elastomeric spring 150, optional outlet one-way valve 90, outlet conduit 110, and dispenser outlet 30 can each comprise or consist of the same material selected from the group consisting of or independently comprise or consist of a material selected from the group consisting of polyoxymethylene, polyethylene, polypropylene, polyethylene terephthalate, acrylonitrile butadiene styrene, and mixtures thereof. The materials selected to form the components of the manually operated pump 3 can be selected so that they can be conveniently separated from the block thermoplastic elastomeric spring 150 via a floatation process, with certain parts designed to sink and others designed to float.

The pump chamber 60, piston 70, stress concentrators 154, and actuator 10 can each be formed from the same type of monomer. The pump chamber 60, piston 70, and actuator 10 can each consist of a single class of recyclable material as defined by the Society of the Plastic Industry as of the priority date of this application. The components of pump 3 can each consist of a single class of recyclable material as defined by the Society of the Plastic Industry as of the priority date of this application.

Figure 4:
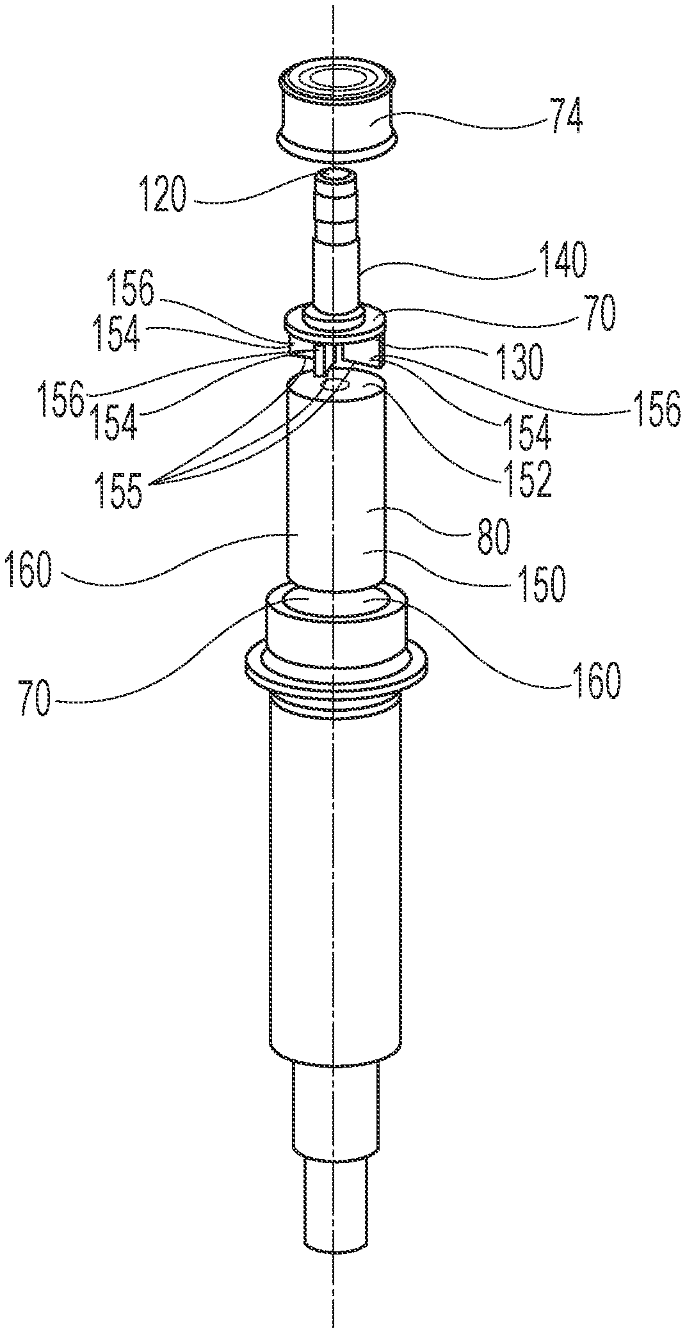
FIG. 4. Exploded view of a portion of a pump dispenser.
Figure 5:
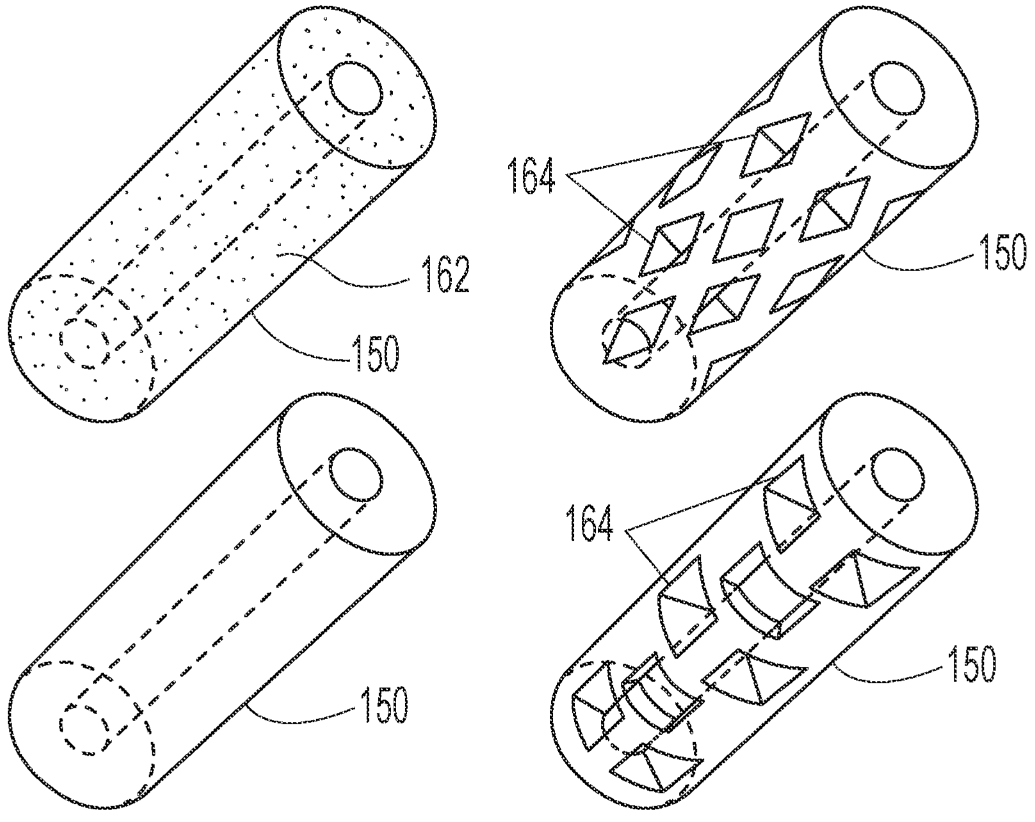
FIG. 5. Nonlimiting example of block thermoplastic elastomeric spring.

A variety of structures are contemplated for the block thermoplastic elastomeric springs 150. The block thermoplastic elastomeric spring 150 can comprise one or more discontinuities. The block thermoplastic elastomeric spring 150 can be a hollow open ended cylinder 160, as shown in FIGS. 3 to 5. If the block thermoplastic elastomeric spring 150 is within the pump chamber 60 a discontinuity 164 or discontinuities 164 can provide for volume within the block thermoplastic elastomeric spring 150 that can recharge and discharge liquid or gel that is to be dispensed. In the instance of a block thermoplastic elastomeric spring 150 that is a hollow open ended cylinder 160 and the block thermoplastic elastomeric spring 150 is within the pump chamber 60, the hollow part can be the effective volume of the pump chamber 60 and material to be dispensed can pass through the open ends of the hollow open ended cylinder 160. The effective volume of the pump chamber 60 is the volume within the pump chamber within which liquid or gel can be stored at any particular position of the piston 70 relative to the pump chamber 60. That is, the hollow part, discontinuity 164, or discontinuities 164 can provide for storage volume within the block thermoplastic elastomeric spring. That storage volume, which is a maximum when the actuator 10 is at the upstroke position, can be cyclically discharged and recharged as the block thermoplastic elastomeric spring 150 cycles through deformation cycles driven by relative movement of the piston 70 and pump chamber 60.

There are a variety of structures that can be employed for the block thermoplastic elastomeric spring 150. Nonlimiting examples of block thermoplastic elastomeric springs 150 are shown in FIG. 4. For example, the block thermoplastic elastomeric spring 150 can be a foam 162. The foam 162 can be an open or closed cell elastomeric foam. Open celled elastomeric foam 162 provides for a greater storage volume within the block thermoplastic elastomeric spring 150. Closed cell elastomeric foam 162 may improve the responsiveness of the manually operated pump 3 in terms of the link between movement of the actuator 10 and discharge of liquid or gel from dispenser outlet 30. Closed cell foam 162 may be less viscoelastic than open celled foam 162, since open cell foam 162 will recharge and discharge with cyclic deformation and the recharge and discharge rates are time dependent functions controlled by the permeability of the open cell foam 162 as a function of strain.

The block thermoplastic elastomeric spring 150 can be a hollow open ended cylinder 160 having a constituent material that is an open or closed cell foam 162. The block thermoplastic elastomeric spring 150 may have a plurality of through holes as discontinuities 164. Discontinuities 164 can provide storage volume and may be provided with a shape and density of number of holes per volume that renders the constituent material to have the desired elasticity and responsiveness over the range of induced strains.

The block thermoplastic elastomeric spring 150 can be monolithic. For example, the block thermoplastic elastomeric spring 150 can be a continuous material without discontinuous voids. A solid hollow cylinder 160 constituted by an elastomeric material is an example of a monolithic elastomeric spring 150.

A hollow open ended cylinder 160 can be a desirable structure since the discontinuity 164 provides for low resistance pathway for flow of liquid or gel through the pump chamber 60. Moreover, the viscoelastic effects associated with recharge and discharge from the within constituent material are reduced or minimized, particularly if the hollow cylinder 160 is monolithic or a closed cell foam 162.

The block thermoplastic elastomeric spring 150 can be a hollow open ended cylinder 160 having a height from about 1 mm to about 60 mm, an outside diameter from about 3 mm to about 90 mm, optionally a height from about 2 mm to about 40 mm, and an outside diameter from about 5 mm to about 70 mm. The thermoplastic elastomeric material constituting the block thermoplastic elastomeric spring 150 can have a durometer greater than about 5 Shore A hardness or greater than about 10 Shore A hardness, or greater than about 20 Shore A hardness.

Figure 6:
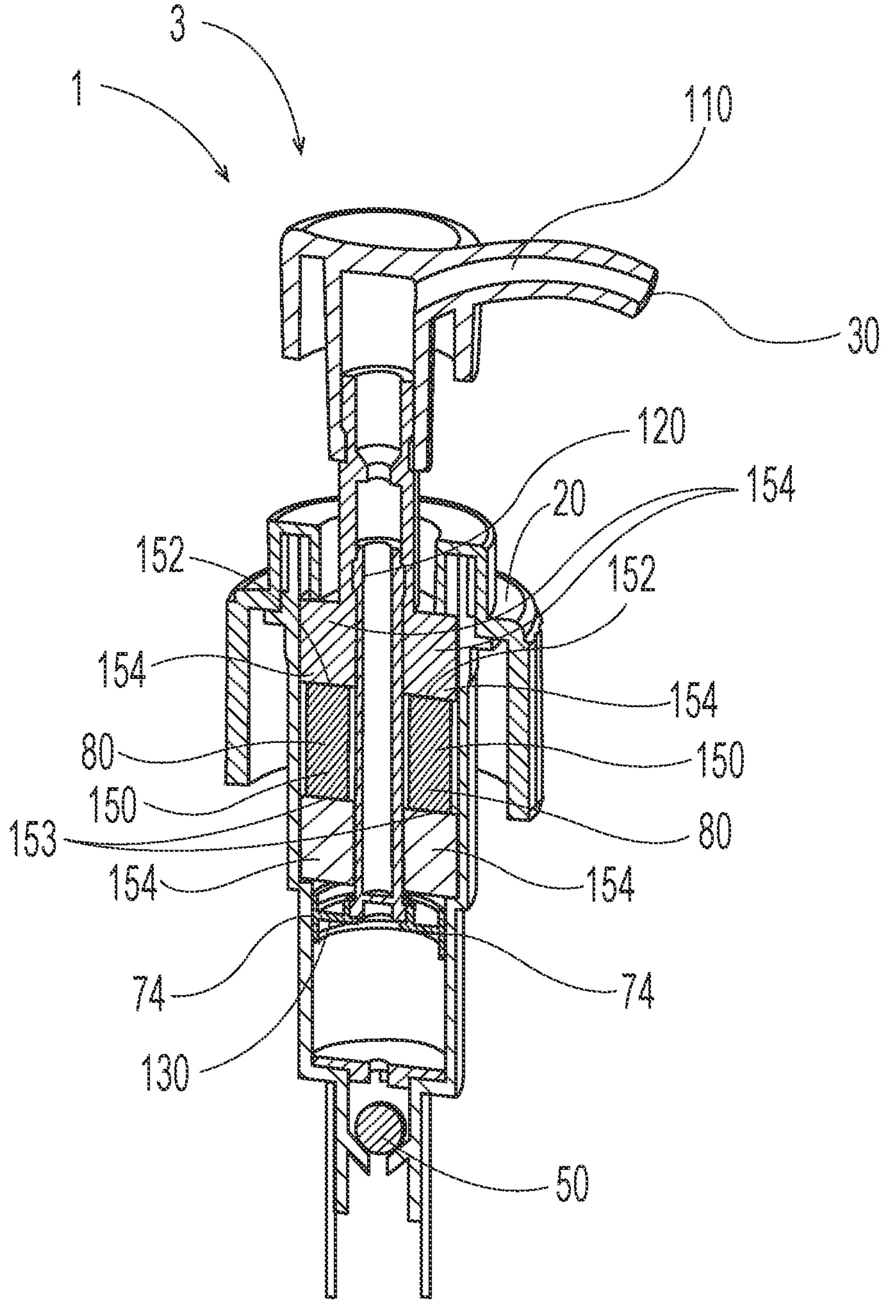
FIG. 6. Pump dispenser having the block thermoplastic elastomeric spring outside the pump chamber.

The thermoplastic elastomeric material constituting the block thermoplastic elastomeric spring 150 can have a durometer from about 5 Shore A hardness to about 60 Shore A hardness, optionally from about 10 Shore A hardness to about 50 Shore A hardness, optionally from about 20 Shore A hardness to about 35 Shore A hardness. Durometer is determined by ISO 7619-1. The pump chamber 60 can have an interior diameter of from about 3 mm to about 90 mm, optionally about 5 mm to about 70 mm, and height of from about 1 mm to about 60 mm, optionally from about 2 mm to about 40 mm. The stress concentrators 154 can contact from about 2% to about 20% of the actuator facing surface 152 and or reaction surface 153. The fraction of the actuator facing surface 152 or reaction surface 153 contacted may can vary as a function of the number of stress concentrators 154 provided. Each of the stress concentrators 154 can be a parallelepiped having a footprint 155 in contact with the actuator facing surface 152 that is 1 mm to 10 mm by 1 mm to 35 mm and a height from about 1 mm to about 20 mm, optionally from about 1 mm to about 10 mm, orthogonal to the footprint 155. The stress concentrators 154 can be positioned uniformly around the central axis A and extend radially away from the central axis A. The piston 70 can have the same diameter as the pump chamber interior diameter, within a tolerance such that the piston 70 and pump chamber 60 can move relative to one another. The intended down stroke length of the rectilinear motion of the piston 70 and pump chamber 60 relative to one another can be from about 2 mm to about 100 mm. Optionally, the block thermoplastic elastomeric spring 150 can be positioned outside the pump chamber 60, with the proviso that a mechanism is provided for supporting the block thermoplastic elastomeric spring 150 during compression thereof and transferring kinetic energy from the block thermoplastic elastomeric spring 150 to the actuator 10 during relaxation of the block thermoplastic elastomeric spring 150. A nonlimiting example of such an embodiment is shown in FIG. 6. Including the appurtenances to provide for an operating spring mechanism 80 outside the pump chamber 60, may result in a taller pump dispenser 1. A reaction body can be provided to resist movement of the block thermoplastic elastomeric spring 150 as the force from the actuator 10 is applied to the block thermoplastic elastomeric spring 150 and on the downstroke of the actuator 10. And a transfer body can be mechanically engaged directly or indirectly with the actuator 10 to transfer stored kinetic energy from the block thermoplastic elastomeric spring 150 to the actuator 10. The transfer body can be integral with or joined directly or indirectly to the actuator 10 which is in turn mechanically engaged with the piston 70.

The aforementioned design for the basic elements of the manually operated pump 3 described above is similarly applicable to a trigger sprayer 2. The difference between a pump dispenser 1 and trigger sprayer 2 is primarily in how the piston 70 is actuated. The actuator 10 of a pump dispenser 1 is typically actuated by the user pressing the actuator 10 with user's palm or fingers and bending her wrist or moving her forearm. A trigger sprayer 2 is typically actuated by hooking one or more of the users fingers around a trigger 40 and pulling one the finger or fingers back toward the user's palm.

Figure 7:
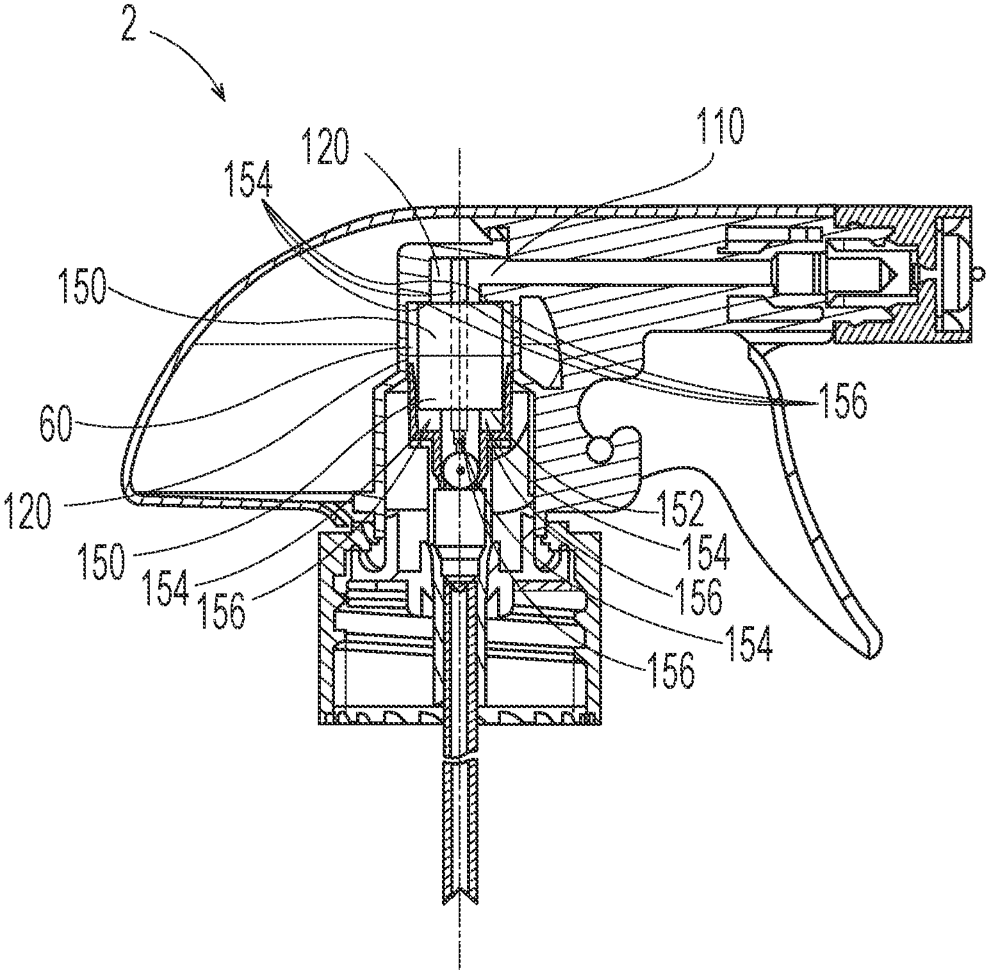
FIG. 7. Trigger sprayer having a hinge.

A side view of part of a manually operated pump 3 that is part of a trigger sprayer 2 is shown in FIG. 7. The actuator 10 can be a trigger 40. The trigger 40 can be rotatable about a hinge 170. The trigger 40 can be mechanically engaged, directly or indirectly, with the piston 70 or pump chamber 60 to provide for movement of the piston 70 and pump chamber 60 relative to one another. A practical arrangement may be one in which the trigger 40 is engaged, directly or indirectly, with the piston 70 that is moveable within a stationary pump chamber 60.

The block thermoplastic elastomeric spring 150 can be within the pump chamber 60. In essence, this is similar to the construction of the manually operated pump 3 in a pump dispenser 1, the difference being in how the manually operated pump 3 is reciprocatingly driven.

Movement of the piston 70 and pump chamber 60 relative to one another may be oriented in line with or generally in line with the movement of trigger 40. Such trigger sprayers 2 may be referred to as having a horizontal pump chamber 60, horizontal being orthogonal to the direction of the gravitation force when the trigger sprayer 2 is being used in an upright position with the dispenser outlet 30 higher than the pump chamber 60. The pump chamber 60 may be horizontally mounted, by way of nonlimiting example as shown in FIG. 8, or generally horizontally mounted, meaning that the axis of rectilinear motion of the piston and or pump chamber is within about 15 degrees of the direction that the dispenser outlet 30 is oriented towards.

Optionally, movement of the piston 70 and pump chamber 60 relative to one another may be oriented perpendicular to or generally perpendicular to movement of the trigger 40. For example, the piston 70 may articulate up and down within a vertically position pump chamber 60, as in FIG. 7. Such arrangements may be referred to as having a vertical pump chamber 60, vertical being inline to the direction of the gravitation force when the trigger sprayer 2 is being used in an upright position with the dispenser outlet 30 higher than the pump chamber 60.

In operation, the block thermoplastic elastomeric spring 150 can be compressed by the user pulling the trigger 40 from the upstroke position to the downstroke position to move the piston 70 and pump chamber 60 relative to one another. The block thermoplastic elastomeric spring 150 is thereby loaded with potential energy. Unloading of block thermoplastic elastomeric spring 150 releases the potential energy as kinetic energy to move the trigger back to its upstroke position. As in the pump dispenser 1 described above, the downstroke can discharge the liquid or gel from the dispenser outlet 30 and the upstroke can reload liquid or gel into the pump chamber 60.

Figure 8:
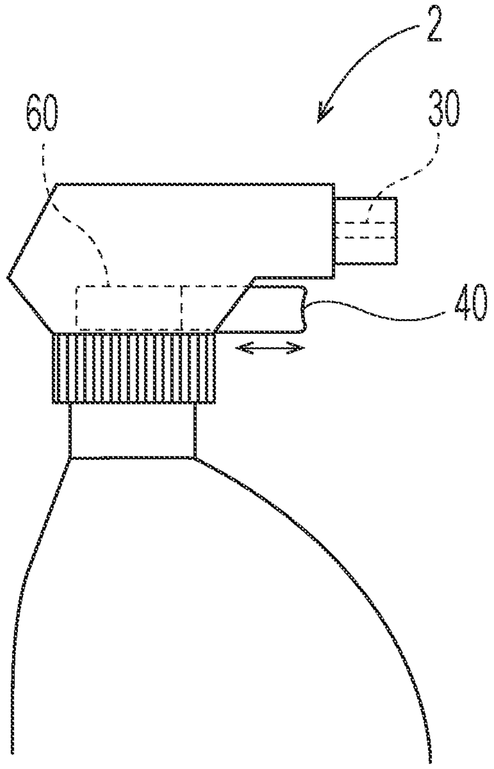
FIG. 8. Trigger sprayer operable by a linear pull.

The trigger 40 can be movable in line with piston 70, by way of a nonlimiting example as shown in FIG. 8. A trigger 40 arranged as such can be a durable construction that is resistant to damage during assembly, shipping, unpacking, shelving, transporting, and use.

The dispenser outlet 30 of a trigger sprayer 2, may include a structure to modify the flow from the conduit leading to the dispenser outlet 30 as the flow exits the dispenser outlet 30. The dispenser outlet 30 can comprise a nozzle 180. A nozzle 180 is a structure that constricts the flow of liquid or gel as compared to flow immediately upstream of the nozzle 180. The nozzle 180 may optionally comprise a swirl chamber to impart angular momentum to the liquid or gel as it passes through the nozzle 180 so that liquid or gel is expelled from the dispenser outlet 30 in a spray cone. Optionally the dispenser outlet 30 may comprise a passively vented nozzle 180 that draws in air to foam the liquid or gel passing through the nozzle 180. Other structures to develop the desired characteristics of the liquid or gel discharged from the dispenser outlet 30 can be included, such as a mesh screen to promote foaming of the discharge.

Structures that can be employed include a nozzle 180, a vented nozzle 180, a nozzle 180 combined with a swirl chamber, a screen, or other constriction or obstruction to create the desired characteristic of the material as it exits the dispenser outlet 30.

Like described previously for the pump dispenser 1, the block thermoplastic elastomeric spring 150 can be positioned outside of the pump chamber 60. Such a design can be advantageous when chemical compatibility of the block thermoplastic elastomeric spring 150 and the liquid or gel to be dispensed is of concern. Further, assembly of the manually operated pump 3 may be convenient if the elastomeric spring 150 is outside of the pump chamber 60. The storage volume of the pump chamber 60 may be increased if the elastomeric spring 150 is outside the pump chamber 60.

Figure 9:
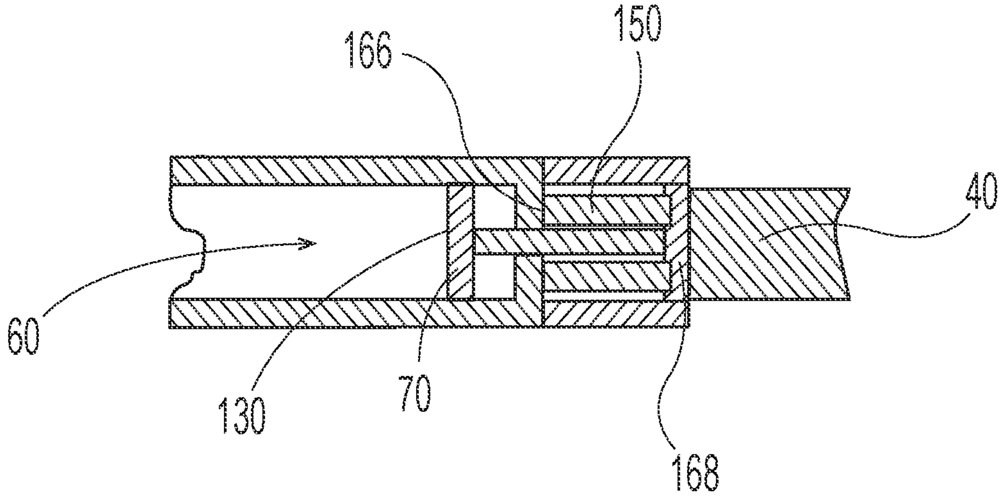
FIG. 9. Portion of a trigger sprayer.

A reaction body 166 can be provided to resist movement of the block thermoplastic elastomeric spring 150 as the force from the trigger 40 is applied to the block thermoplastic elastomeric spring 150 and on the downstroke of the trigger 40 (FIG. 9). And a transfer body 168 can be mechanically engaged directly or indirectly with the piston 70 to transfer stored kinetic energy from the block thermoplastic elastomeric spring 150 to the piston 70 to move the piston 70 in an upstroke. The transfer body 168 can be integral with or joined directly or indirectly to the trigger 40 which is in turn mechanically engaged with the piston 70.

Figure 10A:
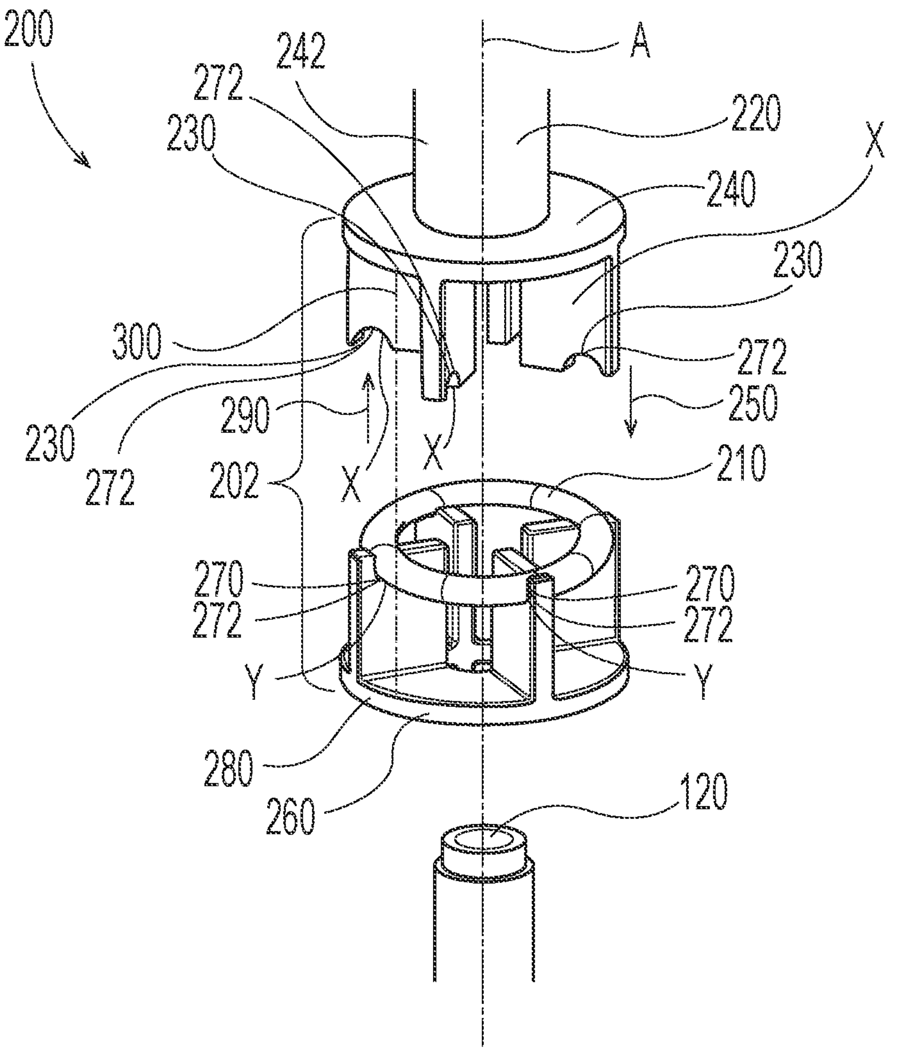
FIG. 10A. Exploded view of an unmobilized compression spring.

The spring mechanism 80 in the manually operated pump 3 can comprise a compression spring 200 (FIGS. 10A, B, and C). The compression spring 200 can operate on the principle that compressive force applied to the compression spring 200 can be mobilized by tension in the continuous thermoplastic elastomeric tube 210 housed within the interior to the compression spring 200. The compression spring 200 can be engaged with the actuator 10. The compression spring 200 can be outside the pump chamber 60. In operation, the compression spring 200 functions by loading in one direction the continuous thermoplastic elastomeric tube 210 at two or more spaced apart locations and loading in an opposite direction the continuous elastomeric tube 210 at two or more other spaced apart locations offset from the aforesaid locations. Parts of the continuous thermoplastic elastomeric tube 210 between supports at which the loads are applied can be stretched and or parts of the thermoplastic elastomeric tube 210 at and near the supports can be deformed. The stretching of the elastomeric tube can be in directions out of plane of the elastomeric tube 210 rather than in the plane of the elastomeric tube 210. For a circular elastomeric tube 210, such as an o-ring, the stretching occurs in directions generally in line with the central axis A of the o-ring rather than as circumferential stretching. The deformation of the thermoplastic elastomeric tube 210 at and near the supports can be in the plane of the elastomeric tube 210.

The compression spring 200 can comprise a continuous thermoplastic elastomeric tube 210 about a central axis A. The compression spring 200 can further comprise a first loading member 220 comprising two first tube supports 230 extending from a first base 240 and circumferentially spaced apart from one another about the central axis A. The first tube supports 230 support the continuous elastomeric 210 tube in a first direction 250 in line with the central axis A. The compression spring 200 further comprises a second loading member 260 comprising two second tube supports 270 extending from a second base 280 and circumferentially spaced apart from one another about the central axis A. The second tube supports 270 support the continuous thermoplastic elastomeric tube 210 in a second direction 290 in line with the central axis and opposite to the first direction 250. The second direction 290 can be opposite the first direction 250. The second tube supports 270 are circumferentially offset from the first tube supports 230. The first base 240 and the second base 280 have a first position (FIG. 10A) in which the first base 240 and the second base 280 are spaced apart from one another along the central axis A by a first distance 300. The first base 240 and the second base 280 have a second position (FIG. 10B) in which the first base 240 and the second base 280 are spaced apart from one another along the central axis by a second distance 310. The second distance 310 can be less than the first distance 300. The first distance 300 and the second distance 310 are scalar quantities (e.g. 3 mm). The first position and the second position can correspond to the upstroke position and the downstroke position, respectively, of the actuator 10

The continuous thermoplastic elastomeric tube 210 is a self-intersecting tube. Examples of a self-intersecting tube include annularly shaped tubes, a rubber band, an o-ring, a HULA HOOP, and a bicycle tire tube. The trace of the tube may be a circle, as in FIGS. 10A and B, oval, rectangle, square, an irregular shape, or other shape as desired. The trace of a tube is the shape of the tube that defines an enclosed area. The set of points defining the cross-section of the continuous thermoplastic elastomeric tube 210 at any portion around the trace of the tube can be a circle, as in FIG. 10A, rectangle, square, polygon, or other closed shape. The cross-section can be solid or hollow. For example, for a typical o-ring, the trace is a circle and the set of points defining the cross-section at locations around the center of the o-ring is a circle as well. That is, the set of points that is a solid circle at all positions around a center at a distance that is the radius of the tube is the tube. The trace of a rubber band can be circular or non-circular, such as a shape have two opposing long edges and two rounded ends connecting the long edges. The thicker the cross section of the continuous elastomeric tube 210 about the central axis A, especially in a direction in line with the central axis A, the greater the tendency for the continuous elastomeric tube 210 to at least partially accommodate some, or even a majority, of the compression of the compression spring 200 by way of local elastic deformation of the continuous elastomeric tube 210 at or near the supports as opposed to stretching of the continuous elastomeric tube 210 between the supports being the dominate mechanism for accommodating compression of the compression spring 200. The continuous elastomeric tube 210 can be an annulus having a rectangular cross section about the central axis A. The continuous elastomeric tube 210 can be an annulus having a rectangular cross section about the central axis, the cross section having a height measured in a direction parallel to the central axis A and a width orthogonal to the height and height to width ratio greater than 0.5, or greater than 0.8, or greater than 1.

The continuous thermoplastic elastomeric tube 210 can be a solid tube or hollow tube. A solid continuous thermoplastic elastomeric tube 210 can be an o-ring. A solid continuous thermoplastic elastomeric tube 210 may be more durable than a hollow one. The continuous thermoplastic elastomeric tube 210 can be a thermoplastic elastomer material. The continuous thermoplastic elastomeric tube 210 can comprise more than 50% thermoplastic elastomer material, by weight of the continuous thermoplastic elastomeric tube 210. The continuous thermoplastic elastomeric tube 210 can comprise more than 90%, or even 100%, thermoplastic elastomer material, by weight of the continuous thermoplastic elastomeric tube 210. The thermoplastic elastomer material can be non-crosslinked or crosslinked. The thermoplastic elastomer material can be selected from the group consisting of styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof. The thermoplastic elastomer material can be selected from the group consisting of buna, butyl, EPDM, natural rubber, and combinations thereof.

The continuous thermoplastic elastomeric tube 210 can have a density greater than 1 g/cm$^3$ or less than 1 g/cm$^3$. The thermoplastic material per se constituting the continuous thermoplastic elastomeric tube 210 can have a density greater than 1 g/cm$^3$ or less than 1 g/cm$^3$. Density of the continuous thermoplastic elastomeric tube 210 and thermoplastic material per se can be increased to a desired level by including densifier materials. Density of the continuous thermoplastic elastomeric tube 210 and thermoplastic material per se can be decreased to a desired level by including lightweight fillers or using a foam structure. Moreover, the density of the continuous thermoplastic elastomeric tube 210 and thermoplastic material per se can be designed so that the part or material thereof floats or sinks in water to facilitate separation of the part or material in a float separation process used in a recycling process for mixed materials.

The continuous thermoplastic elastomeric tube 210 can be supported between the two opposing loading members. Each of the loading members can comprise two tube supports. The tube supports of one loading member are offset from the tube supports of the other loading member. In operation, movement of one loading member towards the other or both of the loading members towards one another forces the continuous thermoplastic elastomeric tube 210 to stretch between the adjacently opposing supports. The continuous thermoplastic elastomeric tube 210 is forced to deform as the adjacently opposing and offset supports intermesh with one another as they move towards and possibly even past one another.

The two first tube supports 230 support the continuous thermoplastic elastomeric tube 210 in a first direction 250 in line with the central axis A. The first tube supports 230 can be spaced apart, optionally circumferentially spaced apart, from one another. The first tube supports 230 can be on opposite sides of the central axis A so that a straight line between the first tube supports 230 passes through the central axis A. The second tube supports 270 can support the continuous thermoplastic elastomeric tube 210 in a second direction 290 in line with the central axis A. The second tube supports 270 can be spaced apart, optionally circumferentially spaced apart, from one another. And the second tube supports 270 can be on opposite sides of the central axis A so that a straight line between the second tube supports 270 passes through the central axis A. The effect of this structure is that the continuous thermoplastic elastomeric tube 210 can be stretched between opposing and offset pairs of a first tube support 230 and a second tube support 270. The first tube supports 230 and the second tube supports 270 can have recesses 272 within which the continuous thermoplastic elastomeric tube is seated. The recesses 272 can restrain deformation of the continuous thermoplastic elastomeric tube 210 in a direction towards or away from the central axis A.

When the first base 240 and second base 280 are in the second position in which relative displacement of the first loading member 220 and second loading member 260 has occurred, strain is mobilized in the continuous thermoplastic elastomeric tube 210 beyond the strain that is mobilized in the continuous thermoplastic elastomeric tube 210 when the first base 240 and second base 280 are in the first position. When the first base 240 and second base 280 are in the second position, the continuous thermoplastic elastomeric tube 210 can be forcibly sagged between the second tube supports 270 and forcibly sagged between the first tube supports 230. The sag referred to is not free sag, as occurs when a string is simply supported by two adjacent supports and sags under its own weight. Rather the forced sag, which is actually stretching, is a forced deformation of the continuous thermoplastic elastomeric tube 210 between two adjacent first tube supports 230 and between two adjacent second tube supports 230, for example as in point load applied to a simply supported string between the simple supports, or even a distributed load over a discreet portion of a simply supported string.

The first base 240 and the second base 280 are the structures through which load that the compression spring 200 carries is transmitted from beyond the compression spring 200, through the first loading member 220 and second loading member 260, to the continuous thermoplastic elastomeric tube 210 via the first tube supports 230 and the second tube supports 270.

In one arrangement, the first tube supports 230 are interleaved with the second tube supports 270 when the first base 240 and the second base 280 are in the second position. In that arrangement and in the second position, the continuous thermoplastic elastomeric tube 210 can have a zig-zag shape around the central axis A, the zig-zag being in directions generally parallel to the central axis A. As the continuous thermoplastic elastomeric tube 210 is strained on the downstroke of the manually operated pump 3, the length of the continuous thermoplastic elastomeric tube 210 can increase, the increase in length being accommodated in directions generally along the central axis A, recognizing that direction is slightly diagonal since the first tube supports 230 and the second tube supports are offset from one another. The release of the stored energy from the strained continuous thermoplastic elastomeric tube 210 can drive the upstroke of the manually operated pump 3. In operation, the continuous thermoplastic elastomeric tube 210 can have a first length when the first base 240 and second base 280 are in the first position, or upstroke position of the actuator 10, and a second length when the first base 240 and the second position 280 are in the second position, or downstroke position of the actuator, the second length being greater than the first length. More simply stated, the continuous thermoplastic elastomeric tube 210 resists compression of the compression spring 200 by the thermoplastic elastomeric tube 210 stretching or being deformed within the compression spring 200. The aforesaid structure of the compression spring 200 provides the space for the thermoplastic elastomeric tube 210 to mobilize tension or accommodate deformation forced thereupon by compression of the compression spring 200.

Considering the first tube supports 230 as X supports and second tube supports 270 as Y supports, the arrangement shown in FIGS. 10A, B, and C is X-Y-X-Y-X-Y-X-Y. Other interleaved relationships are contemplated, including X-Y-Y-X-Y-Y, in which the X's are interleaved with Y's immediately next to each X and there are two Y's next to one another without an X therebetween, X-Y-X-Y, and X-Y-X-Y-X-Y. The lengths of the continuous thermoplastic elastomeric tube 210 supported by each of the tube supports may differ from one another as may the heights of the tube supports in the direction parallel to the central axis A. The tube supports may also differ in their shape (e.g. width, aspect ratio) and or material of construction. The tube supports may be constructed of a single material or of more than one material. The tube supports may be constructed from the same material as the first and/or second base or may be constructed from a different material. Lengths of the continuous thermoplastic elastomeric tube 210 supported by each of the tube supports may be the same as one another, which may result in more uniform strain being applied to the continuous thermoplastic elastomeric tube 210 as compared an arrangement in which the lengths supported differ from one another.

In the X-Y-X-Y-X-Y-X-Y arrangement, the first loading member 220 comprises four first tube supports 230 extending from the first base 240 and spaced apart, optionally circumferentially spaced apart, optionally evenly circumferentially spaced apart, from one another about the central axis A and supporting the continuous thermoplastic elastomeric tube 210 in the first direction 250 in line with the central axis A. And the second loading member 260 comprises four second tube supports 270 extending from the second base 280 and spaced apart, optionally circumferentially spaced apart, optionally evenly circumferentially spaced apart, from one another about the central axis A and supporting the continuous thermoplastic elastomeric tube 210 in the second direction 290 in line with the central axis A and opposite to the first direction 250. The second tube supports 270 are offset, optionally circumferentially offset, optionally evenly circumferentially offset, from the first tube supports 230.

It may be practical to have some strain mobilized in the continuous thermoplastic elastomeric tube 210 when the first base 240 and the second base 280 are in the first position. This may improve the initial responsiveness of the compression spring 200 from its at-rest condition, as compared to a construction in which the continuous thermoplastic elastomeric tube 210 is at zero strain about the tube. That might be achieved by providing the first tube supports 230 slightly interleaved with the second tube supports 270 when the first base 240 and the second base 280 are in the first position. That is, only portions of, for example the tips of, the first tube supports 230 and second tube supports 270 are interleaved with one another.

Figure 10B:
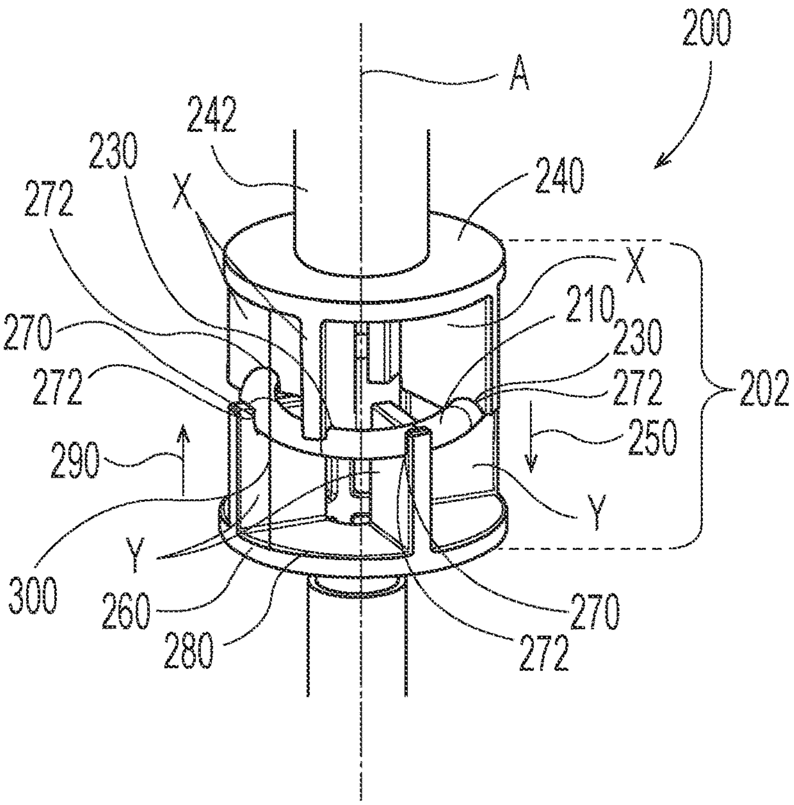
FIG. 10B. Unmobilized compression spring.
Figure 10C:
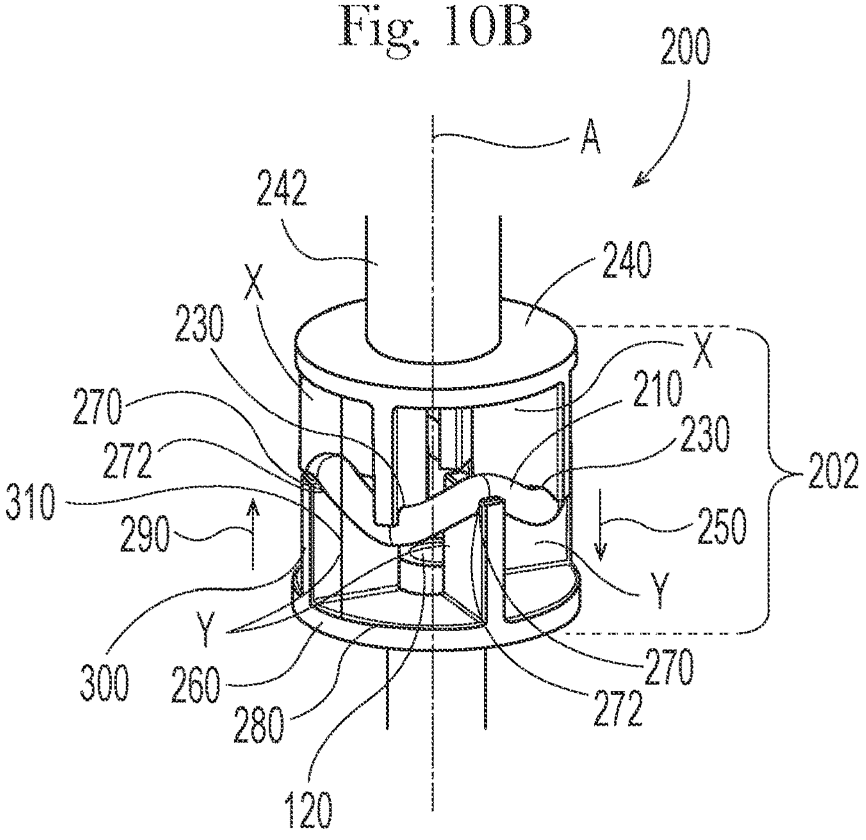
FIG. 10C. Mobilized compression spring.

As shown in FIGS. 10A, 10B, and 10C, the first tube supports 230 can be circumferentially spaced apart, optionally evenly circumferentially spaced apart, from one another about the central axis A and the second tube supports 270 can be circumferentially spaced apart, optionally evenly circumferentially spaced apart, from one another about the central axis A offset from the first tube supports 230. Interleaving can be facilitated by the second tube supports 270 being circumferentially offset from the first tube supports 230.

The continuous thermoplastic elastomeric tube 210 can be a solid o-ring having a circular cross section about the central axis A. The o-ring can have a diameter from about 3 mm to about 65 mm and cross sectional area about the central axis A from about 0.1 $mm^2$ to about 10 $mm^2$. The o-ring can comprise or consist of elastomeric class materials having a durometer from about Shore OO-20 to about Shore A-90. The first tube supports 230 can cumulatively support from about 2% to about 20%, optionally about 5% to about 15%, of the circumference of each continuous thermoplastic elastomeric tube 210. The second tube supports 270 can cumulatively support from about 2% to about 20%, optionally about 5% to about 15%, of the circumference of each continuous thermoplastic elastomeric tube 210. The first base 240 and second base 280 in the first position can be separated from one another by a first distance 300 from about 0.3 mm to about 50 mm, optionally from about 0.6 mm to about 30 mm. In the second position, the first base 240 and second base 280 can be separated from one another by a second distance 310 (FIG. 10C) from about 0.2 mm to about 40 mm, optionally from about 0.5 mm to about 20 mm. A compression spring 200 can have an operable range of intended motion from about 0.1 mm to about 15 mm, optionally from about 0.1 mm to about 10 mm. The compression spring 200 or one or more compression springs 200 combined in series can have an operable range of intended motion from about 0.1 mm to about 40 mm, optionally from about 0.2 mm to about 25 mm. The operable range of motion can be set to be the same as the stroke length of the rectilinear motion of the piston 70 relative to the pump chamber 60. When a series of compression springs 200 are employed, the elastomeric tubes 210 can have the same characteristic dimensions and or comprise the same constituent material or the elastomeric tubes 210 can have characteristic dimensions that differ from one another and or comprise different constituent materials.

The first base 240 and the second base 280 can be disposed of within a guide 320 and at least one of the first base 240 and second base 280 can be moveable within the guide 320 in line with the central axis A. The guide 320 constrains movement of the first base 240 and second base 280 to be one dimensional. The guide can be a cylinder, which provides for simple manufacture and design of the component parts of the compression spring 200. In a pump dispenser 1, the guide 320 may be part of the housing 20. Optionally, the guide 320 can be the pump chamber 60, if the elements of the compression spring 200 are within the pump chamber 60. The guide 320, or whatever structure forms such guide, acts as the working cylinder of a shock absorber to restrain deformation of the shock absorber to one dimension.

A stem 242 can extend from the first base 240. The stem 242 can be a rigid body, optionally a generally cylindrical rigid body, capable of transmitting load applied to the actuator 10 to the base 242, which in turn transmits the load to the first tube supports 230. The end of the stem 242 proximal the actuator 10 can be shaped so that a hinged trigger 40 can be used to move the stem 242. For example the end of the stem 242 proximal the actuator 10 can be rounded to couple with a cup of the actuator. The stem 242 can optionally be joined to the actuator 10.

The compression spring 200 and parts thereof, including the continuous thermoplastic elastomeric tube 210, first loading member 220, first tube support 230, first base 240, second loading member 260, second tube support 270, second base 280, and guide 320, and the pump chamber 60, piston 70, and actuator 10 can each comprise or consist of the same material selected from the group consisting of or independently comprise or consist of a material selected from the group consisting of polyoxymethylene, polyethylene polypropylene, polyethylene terephthalate, acrylonitrile butadiene styrene, buna, butyl, and mixtures thereof. The materials selected to form the components of the manually operated pump 3 and the compression spring 200 can be selected so that various components can be conveniently separated from one another via a floatation process, with certain parts designed to sink and others designed to float. A compression spring 200 as described herein can be practical in that the entirety of the compression spring 200 can be non-metallic which may simplify recycling.

The pump chamber 60, piston 70, first loading member 220, first tube supports 230, base 240, second loading member 260, second tube supports 270, second base 280, guide 320, and actuator 10 can each be formed from the same type of monomer. The pump chamber 60, piston 70, first loading member 220, first tube supports 230, base 240, second loading member 260, second tube supports 270, second base 280, guide 320, and actuator 10 can each consist of a single class of recyclable material as defined by the Society of the Plastic Industry as of the priority date of this application. The components of pump 3 can each consist of a single class of recyclable material as defined by the Society of the Plastic Industry as of the priority date of this application.

Figure 11:
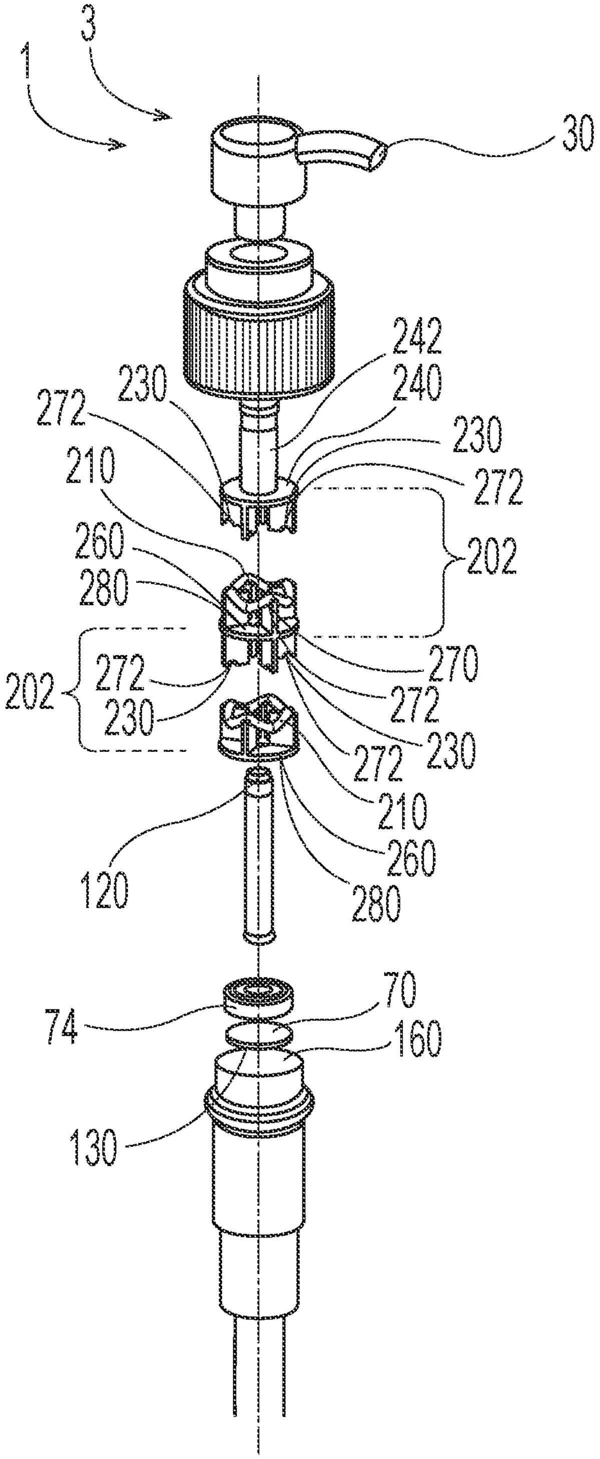
FIG. 11. Compression spring having a plurality of spring elements.

To provide for more displacement from the compression spring 200, the continuous thermoplastic elastomeric tube, the first loading member 220, the first base 240, the second loading member 260, and the second base 280 together form a spring element 202, and the compression spring 200 can comprise a plurality of spring elements 202 arranged in series with one another along the central axis A, as shown in FIG. 11. As shown in FIG. 11, the second base 280 can be shared in common with an adjacent spring element 202 as a first base 240 of the second spring element 202. That is, the second base 280 can be the first base 240 of the adjacent spring element 202. This arrangement can provide for increasing the deformation range of the compression spring 200 without increasing the amount of strain that needs to be mobilized in an individual continuous thermoplastic elastomeric tube 210 or complicate the structural design of the tube supports. Large cyclic strains imposed upon the continuous thermoplastic elastomeric tube 210 may result in undesirable fatigue of the material.

The compression spring 200 can be positioned within or outside of the pump chamber 60. For example, the compression spring 200 or a series of compression springs 200 may replace the block thermoplastic elastomeric spring 150 shown in FIGS. 3 to 6.

Figure 12:
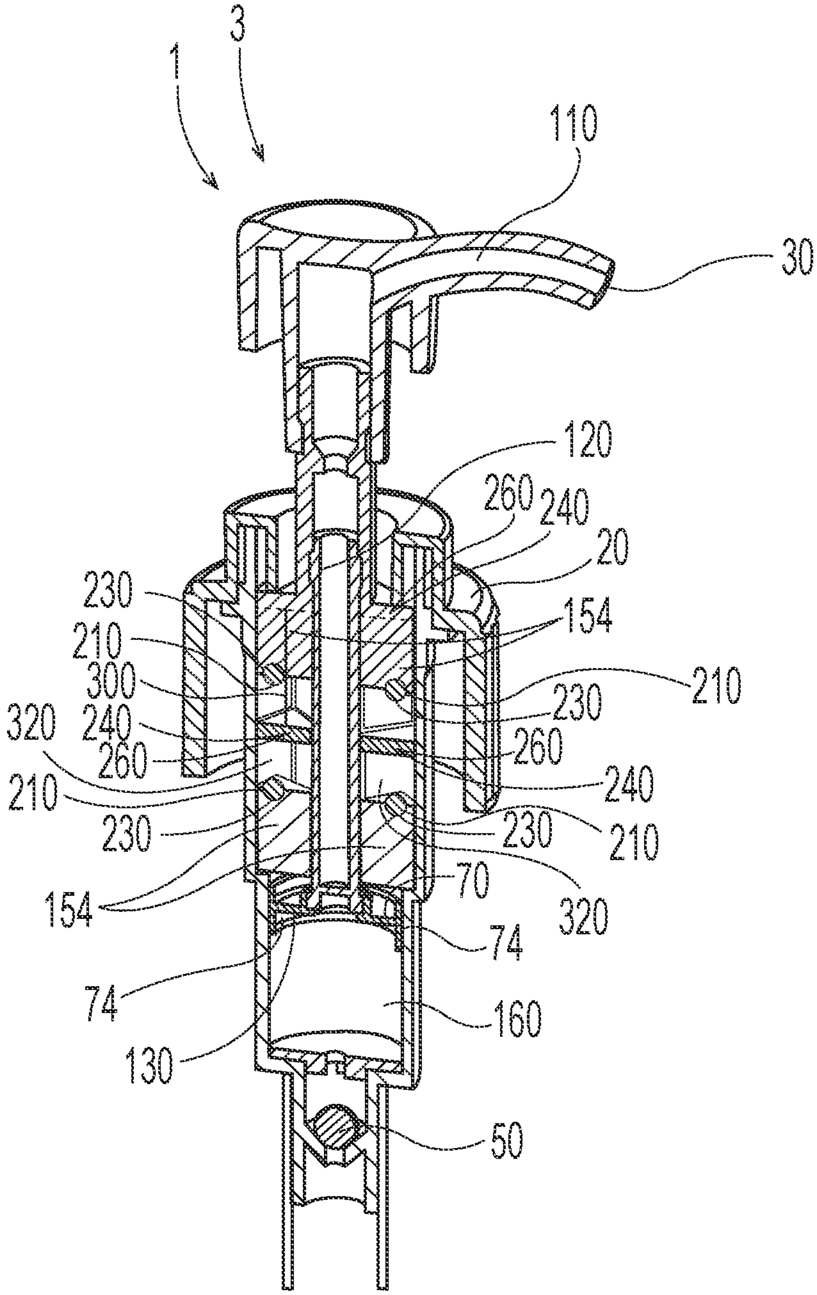
FIG. 12. Pump dispenser having a compression spring having a plurality of spring elements.

A pump dispenser 1 that comprise a pair of compression springs 200 outside the pump chamber 60 is shown in FIG. 12. Such an arrangement can be practical to reduce the potential for chemical incompatibility of the parts of the compression spring 200 and the liquid or gel being pumped.

Combinations

An example is below:

A. A manually operated pump (3) comprising:
an inlet one-way valve (50);
a pump chamber (60) downstream of and in fluid communication with said inlet one-way valve;
a piston (70) interior to said pump chamber and slideably engaged with said pump chamber;
an actuator (10) engaged with said piston or said pump chamber; and
a block thermoplastic elastomeric spring (150) engaged with said actuator to move said actuator as said block thermoplastic elastomeric spring relaxes.

B. The pump according to Paragraph A, wherein said block thermoplastic elastomeric spring has an actuator facing surface (152) oriented towards said actuator, wherein only a portion of said actuator facing surface is engaged with said actuator through one or more stress concentrators (154).

C. The pump according to Paragraph B, wherein said stress concentrators are between said actuator facing surface and said piston.

D. The pump according to Paragraphs A to C, wherein said block thermoplastic elastomeric spring has an actuator facing surface (152) oriented towards said actuator and an opposing reaction surface (153), wherein only a portion of said reaction surface is engaged with one or more stress concentrators (154).

E. The pump according to any of Paragraphs A to D, wherein said actuator is engaged with said piston.

F. The pump according to any of Paragraphs A to E, wherein said block thermoplastic elastomeric spring is within said pump chamber.

G. The pump according to any of Paragraphs A to E, wherein said block thermoplastic elastomeric spring is outside said pump chamber.

H. The pump according to any of Paragraphs A to G, wherein said block thermoplastic elastomeric spring has a plurality of discontinuities (164).

I. The pump according to any of Paragraphs A to H, wherein said block thermoplastic elastomeric spring is an open or closed cell elastomeric foam (162).

J. The pump according to any of Paragraphs A to H, wherein said block thermoplastic elastomeric spring is monolithic.

K. The pump according to any of Paragraphs A to J, wherein said block thermoplastic elastomeric spring is a hollow open ended cylinder (160).

L. The pump according to any of Paragraphs A to K, wherein said actuator includes a trigger (40) rotatable about a hinge (170).

M. The pump according to any of Paragraphs A to K, wherein said actuator is a trigger (40) movable in line with said piston.

N. The pump according to any of Paragraphs A to M, wherein said pump further comprises an outlet one-way valve (90) downstream of and in fluid communication with said pump chamber, O. The pump according to Paragraph N, wherein said pump comprises an outlet conduit (110) downstream of said outlet one-way valve and a dispenser outlet (30) downstream of said outlet conduit, wherein said dispenser outlet comprises a nozzle (180).

P. The pump according to Paragraph N or O, wherein said pump comprises an outlet conduit (110) downstream of said outlet one-way valve and a dispenser outlet (30) downstream of said outlet conduit, wherein said actuator, said outlet conduit, and said outlet one-way valve together are rectilinearly moveable to drive said piston.

Q. The pump according to any of Paragraphs A to O, wherein said actuator and said outlet conduit together are rectilinearly moveable to drive said piston.

R. The pump according to any of Paragraphs A to Q, wherein said pump chamber, said piston, and said actuator are each formed from the same type of monomer.

S. The pump according to any of Paragraphs A to R, wherein said pump chamber, said piston, and said actuator are each formed from the same type of polymer.

T. The pump according to any of Paragraphs A to S, wherein said block thermoplastic elastomeric spring comprises a thermoplastic elastomer material selected from the group consisting of styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof.

U. The pump according to any of Paragraphs A to S, wherein said pump comprises a plurality of said block thermoplastic elastomeric springs stacked in series with one another.

V. The pump according to any of Paragraphs A to U, wherein said block thermoplastic elastomeric spring has a density less than that of constituent materials of said pump chamber, piston, and said actuator.

W. The pump according to any of Paragraphs A to U, wherein said block thermoplastic elastomeric spring has a density greater than that of constituent materials of said pump chamber, piston, and said actuator The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A manually operated pump comprising:

an inlet one-way valve;

a pump chamber downstream of and in fluid communication with said inlet one-way valve;

a piston interior to said pump chamber and slideably engaged with said pump chamber;

an actuator engaged with said piston or said pump chamber; and a block thermoplastic elastomeric spring engaged with said actuator to move said actuator as said block thermoplastic elastomeric spring relaxes;

wherein said block thermoplastic elastomeric spring is within said pump chamber and between said piston and said inlet one-way valve.

2. The pump according to claim 1, wherein said actuator is engaged with said piston.

3. The pump according to claim 1, wherein said block thermoplastic elastomeric spring has an actuator facing surface oriented towards said actuator, wherein only a portion of said actuator facing surface is engaged with said actuator through one or more stress concentrators.

4. The pump according to claim 3, wherein said stress concentrators are between said actuator facing surface and said piston.

5. The pump according to claim 4, wherein said stress concentrators extend from said piston.

6. The pump according to claim 5, wherein said block thermoplastic elastomeric spring is a hollow open ended cylinder.

7. The pump according to claim 3, wherein said block thermoplastic elastomeric spring has reaction surface oriented away from said actuator, wherein only a portion of said reaction surface is engaged with one or more said stress concentrators.

8. The pump according to claim 1, wherein said block thermoplastic elastomeric spring has a reaction surface oriented away from said actuator, wherein only a portion of said reaction surface is engaged with one or more stress concentrators.

9. The pump according to claim 1, wherein said block thermoplastic elastomeric spring has a plurality of discontinuities or is an open or closed cell elastomeric foam.

10. The pump according to claim 1, wherein said block thermoplastic elastomeric spring is monolithic.

11. The pump according to claim 1, wherein said block thermoplastic elastomeric spring is a hollow open ended cylinder.

12. The pump according to claim 1, wherein said block thermoplastic elastomeric spring comprises a thermoplastic elastomer material selected from the group consisting of styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof.

13. The pump according to claim 1, wherein said pump comprises an outlet conduit downstream of said pump chamber and a dispenser outlet downstream of said outlet conduit, wherein said actuator, said outlet conduit, and said dispenser outlet together are rectilinearly moveable to drive said piston.

14. The pump according to claim 1, wherein said pump further comprises an outlet one-way valve downstream of and in fluid communication with said pump chamber.

15. The pump according to claim 1, wherein said actuator is a trigger rotatable about a hinge.

16. The pump according to claim 1, wherein said block thermoplastic elastomeric spring has a density less than that of constituent materials of said pump chamber, piston, and said actuator.

17. A manually operated pump comprising:

an inlet one-way valve;

a pump chamber downstream of and in fluid communication with said inlet one-way valve;

a piston interior to said pump chamber and slideably engaged with said pump chamber;

an actuator engaged with said piston or said pump chamber; and a block thermoplastic elastomeric spring engaged with said actuator to move said actuator as said block thermoplastic elastomeric spring relaxes;

wherein said block thermoplastic elastomeric spring has an actuator facing surface oriented towards said actuator, wherein only a portion of said actuator facing surface is engaged with said actuator through one or more stress concentrators;

wherein said actuator is engaged with said piston;

wherein said block thermoplastic elastomeric spring is within said pump chamber and between said piston and said inlet one-way valve;

wherein said stress concentrators are between said actuator facing surface and said piston;

wherein said stress concentrators extend from said piston;

wherein said block thermoplastic elastomeric spring is a hollow open ended cylinder;

wherein said block thermoplastic elastomeric spring comprises a thermoplastic elastomer material selected from the group consisting of styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof; and wherein said pump comprises an outlet conduit downstream of said pump chamber and a dispenser outlet downstream of said outlet conduit, wherein said actuator, said outlet conduit, and said dispenser outlet together are rectilinearly moveable to drive said piston.

18. A manually operated pump comprising:

an inlet one-way valve;

a pump chamber downstream of and in fluid communication with said inlet one-way valve;

a piston interior to said pump chamber and slideably engaged with said pump chamber;

an actuator engaged with said piston or said pump chamber; and a block thermoplastic elastomeric spring engaged with said actuator to move said actuator as said block thermoplastic elastomeric spring relaxes;

wherein said block thermoplastic elastomeric spring has an actuator facing surface oriented towards said actuator, wherein only a portion of said actuator facing surface is engaged with said actuator through one or more stress concentrators;

wherein said stress concentrators contact from about 2% to about 20% of said actuator facing surface.

19. The pump according to claim 18, wherein said block thermoplastic elastomeric spring has a density less than that of constituent materials of said pump chamber, piston, and said actuator.

20. The pump according to claim 18, wherein said block thermoplastic elastomeric spring is within said pump chamber and between said piston and said inlet one-way valve.

* * * * *